US011732612B2

(12) United States Patent
Molnar, Jr. et al.

(10) Patent No.: US 11,732,612 B2
(45) Date of Patent: Aug. 22, 2023

(54) TURBINE ENGINE FAN TRACK LINER WITH TIP INJECTION AIR RECIRCULATION PASSAGE

(71) Applicant: Rolls-Royce North American Technologies Inc., Indianapolis, IN (US)

(72) Inventors: Daniel E. Molnar, Jr., Lebanon, IN (US); Robert W. Heeter, Noblesville, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 0 days.

(21) Appl. No.: 17/560,225

(22) Filed: Dec. 22, 2021

(65) Prior Publication Data
US 2023/0193785 A1    Jun. 22, 2023

(51) Int. Cl.
*F04D 29/52* (2006.01)
*F01D 25/26* (2006.01)
*F01D 9/06* (2006.01)
*F01D 25/24* (2006.01)
*F04D 29/68* (2006.01)
*F01D 21/04* (2006.01)

(52) U.S. Cl.
CPC .......... *F01D 25/26* (2013.01); *F01D 9/065* (2013.01); *F01D 21/045* (2013.01); *F01D 25/24* (2013.01); *F04D 29/526* (2013.01); *F04D 29/685* (2013.01); *F05D 2220/32* (2013.01); *F05D 2230/60* (2013.01); *F05D 2240/14* (2013.01); *F05D 2260/60* (2013.01)

(58) Field of Classification Search
CPC ............ F01D 21/045; F01D 5/145; F01D 25/24-285; F04D 29/52-526; F04D 29/684; F04D 29/681; F04D 29/682; F04D 29/685; F04D 27/023; F04D 27/0238; F04D 27/0207; F04D 27/009; F04D 27/4226; F04D 27/403; F04D 27/40; F02C 9/18
See application file for complete search history.

(56) References Cited

U.S. PATENT DOCUMENTS

| | | | |
|---|---|---|---|
| 5,205,513 A * | 4/1993 | Schilling | B64D 27/18 244/54 |
| 5,308,225 A | 5/1994 | Koff et al. | |
| 5,431,533 A * | 7/1995 | Hobbs | F01D 11/08 415/58.7 |
| 5,458,457 A * | 10/1995 | Goto | F04D 29/661 415/115 |
| 5,474,417 A | 12/1995 | Privett et al. | |
| 5,607,284 A | 3/1997 | Byrne et al. | |
| 5,707,206 A * | 1/1998 | Goto | F04D 29/4213 415/173.1 |

(Continued)

*Primary Examiner* — J. Todd Newton
*Assistant Examiner* — Behnoush Haghighian
(74) *Attorney, Agent, or Firm* — Barnes & Thornburg LLP

(57) ABSTRACT

A fan case assembly adapted for use with a gas turbine engine includes a fan track liner and an annular case. The fan track liner extends circumferentially at least partway about a central axis of the gas turbine engine. The annular case is configured to support the fan track liner at a radial position relative to the central axis. The fan case assembly further includes an air recirculation duct configured to redirect air around the fan track liner.

20 Claims, 13 Drawing Sheets

(56) References Cited

U.S. PATENT DOCUMENTS

| | | | |
|---|---|---|---|
| 6,289,665 B1 | 9/2001 | Saiz | |
| 6,382,905 B1* | 5/2002 | Czachor | F04D 29/526 |
| | | | 415/128 |
| 6,585,479 B2 | 7/2003 | Torrance | |
| 7,074,006 B1* | 7/2006 | Hathaway | F01D 11/10 |
| | | | 415/58.7 |
| 7,077,623 B2 | 7/2006 | Guemmer | |
| 7,631,483 B2 | 12/2009 | Mani et al. | |
| 7,811,049 B2* | 10/2010 | Xu | F04D 29/684 |
| | | | 415/54.1 |
| 7,870,721 B2* | 1/2011 | Winter | F04D 29/684 |
| | | | 137/15.1 |
| 7,967,556 B2 | 6/2011 | Guemmer | |
| 8,043,046 B2 | 10/2011 | Guemmer | |
| 8,082,726 B2* | 12/2011 | Cloft | F02K 3/06 |
| | | | 60/785 |
| 8,152,444 B2 | 4/2012 | Guemmer | |
| 8,152,445 B2 | 4/2012 | Guemmer | |
| 8,152,467 B2 | 4/2012 | Guemmer | |
| 8,182,209 B2 | 5/2012 | Brault et al. | |
| 8,192,148 B2* | 6/2012 | Guemmer | F04D 29/681 |
| | | | 415/144 |
| 8,234,869 B2* | 8/2012 | Tuan | F02C 7/042 |
| | | | 60/725 |
| 8,262,340 B2 | 9/2012 | Guemmer | |
| 8,262,351 B2 | 9/2012 | Clemen et al. | |
| 8,403,630 B2 | 3/2013 | Guemmer | |
| 8,683,811 B2 | 4/2014 | Clemen et al. | |
| 8,882,443 B2 | 11/2014 | Agneray et al. | |
| 8,888,440 B2* | 11/2014 | Tomita | F04D 27/023 |
| | | | 415/58.4 |
| 9,074,605 B2* | 7/2015 | Bouru | F04D 29/522 |
| 9,115,594 B2 | 8/2015 | Krautheim | |
| 9,574,571 B2* | 2/2017 | Kawano | F04D 29/4273 |
| 9,664,204 B2 | 5/2017 | Guemmer | |
| 9,677,570 B2* | 6/2017 | Care | F04D 19/002 |
| 9,771,856 B2* | 9/2017 | Nakao | F04D 29/444 |
| 9,822,792 B2* | 11/2017 | Guemmer | F04D 29/526 |
| 10,006,467 B2* | 6/2018 | Guemmer | F04D 29/541 |
| 10,041,500 B2 | 8/2018 | Streit | |
| 10,145,387 B2 | 12/2018 | Knight et al. | |
| 10,180,082 B2* | 1/2019 | Snyder | F01D 25/24 |
| 10,711,797 B2* | 7/2020 | Kroger | F04D 29/684 |
| 10,724,435 B2* | 7/2020 | Kroger | F04D 29/563 |
| 10,731,507 B2* | 8/2020 | Engebretsen | F01D 21/045 |
| 10,815,886 B2* | 10/2020 | Kroger | F04D 29/541 |
| 11,293,293 B2* | 4/2022 | Zha | F04D 29/685 |
| 2005/0226717 A1* | 10/2005 | Xu | F04D 27/0238 |
| | | | 415/58.5 |
| 2008/0112799 A1* | 5/2008 | Winter | F02C 7/047 |
| | | | 415/145 |
| 2009/0000272 A1* | 1/2009 | Cloft | F02C 9/18 |
| | | | 60/226.1 |
| 2009/0047117 A1* | 2/2009 | Xu | F04D 29/682 |
| | | | 415/58.5 |
| 2012/0031501 A1* | 2/2012 | Tuan | F02K 1/827 |
| | | | 137/15.1 |
| 2014/0119883 A1* | 5/2014 | Kempf | F04D 29/164 |
| | | | 415/110 |
| 2016/0069214 A1* | 3/2016 | Engebretsen | F01D 21/045 |
| | | | 415/196 |
| 2017/0175676 A1* | 6/2017 | Murooka | F04D 29/542 |
| 2018/0171871 A1* | 6/2018 | Duong | F02C 7/04 |
| 2018/0363554 A1* | 12/2018 | Kroger | F02C 3/04 |
| 2018/0363676 A1* | 12/2018 | Kroger | F04D 29/542 |
| 2018/0363677 A1* | 12/2018 | Kroger | F04D 29/681 |
| 2019/0226350 A1* | 7/2019 | Zha | F04D 29/526 |
| 2020/0123924 A1* | 4/2020 | Finlayson | F02K 3/06 |
| 2020/0298987 A1* | 9/2020 | Evans | B64D 33/02 |
| 2020/0386107 A1* | 12/2020 | Hoisington | F01D 9/04 |

* cited by examiner

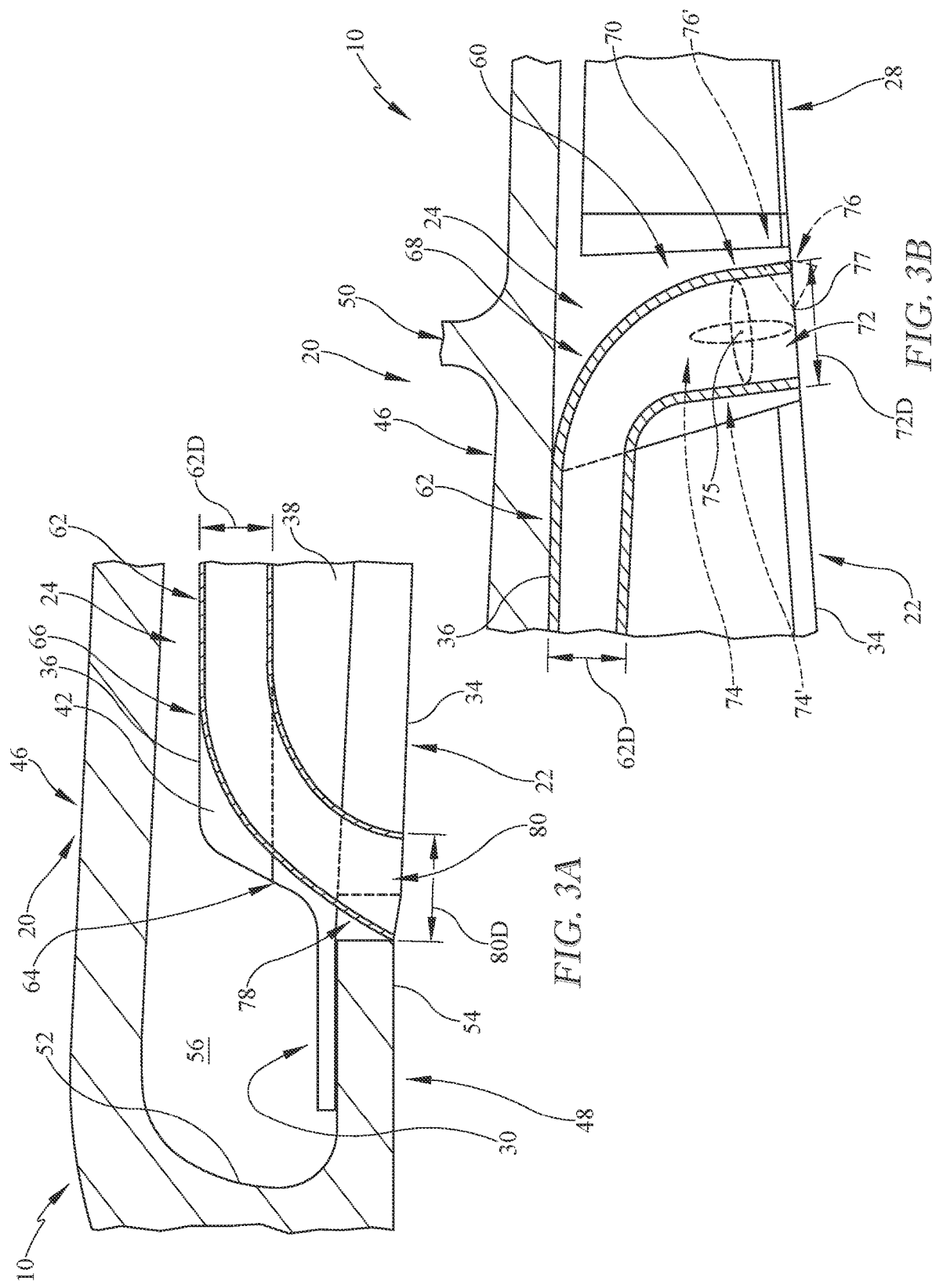

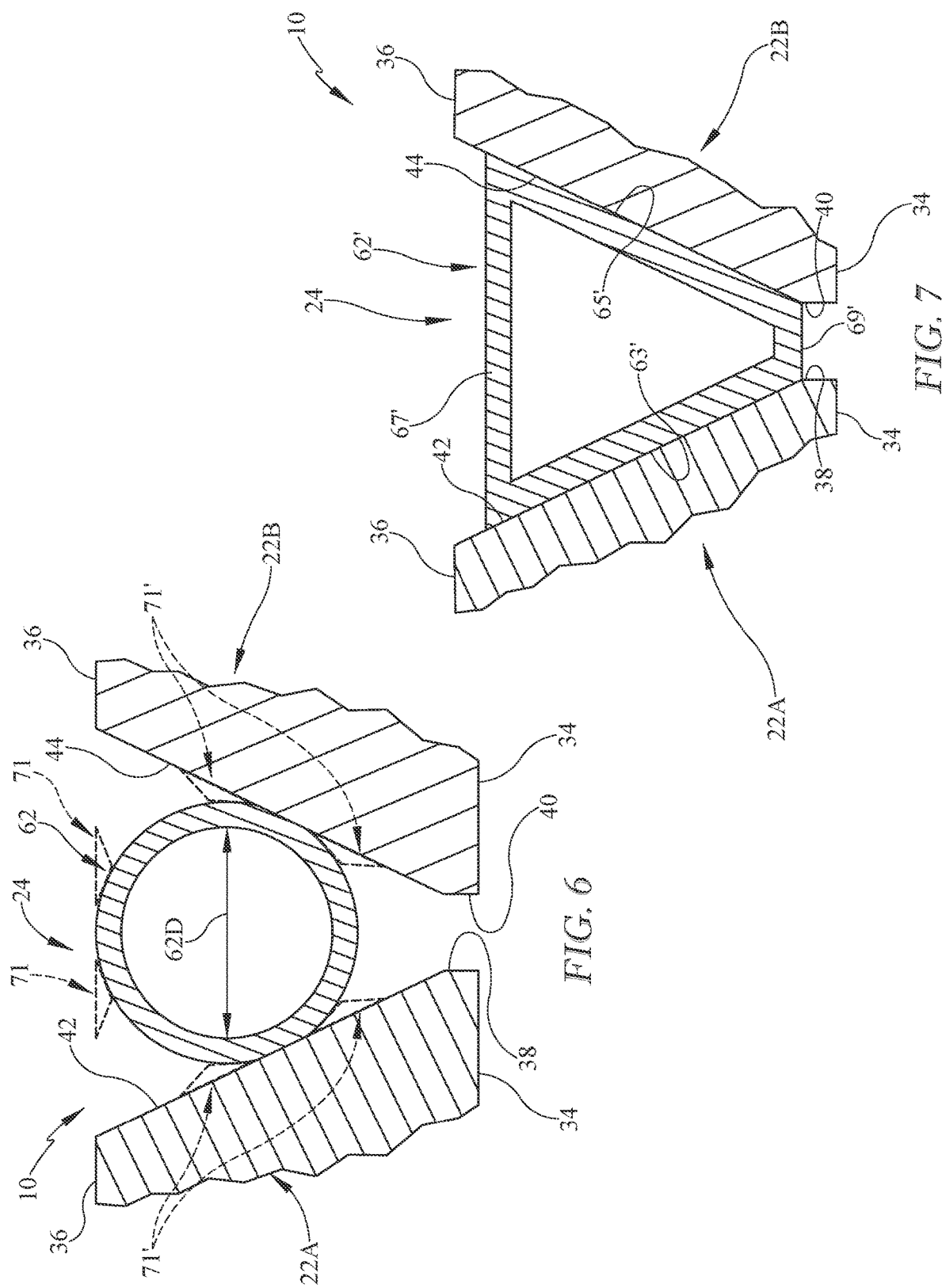

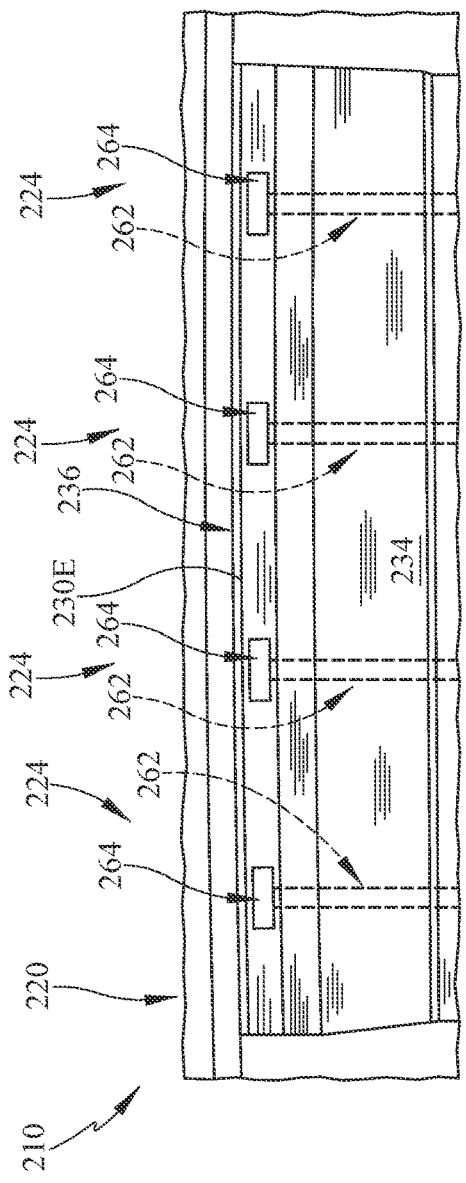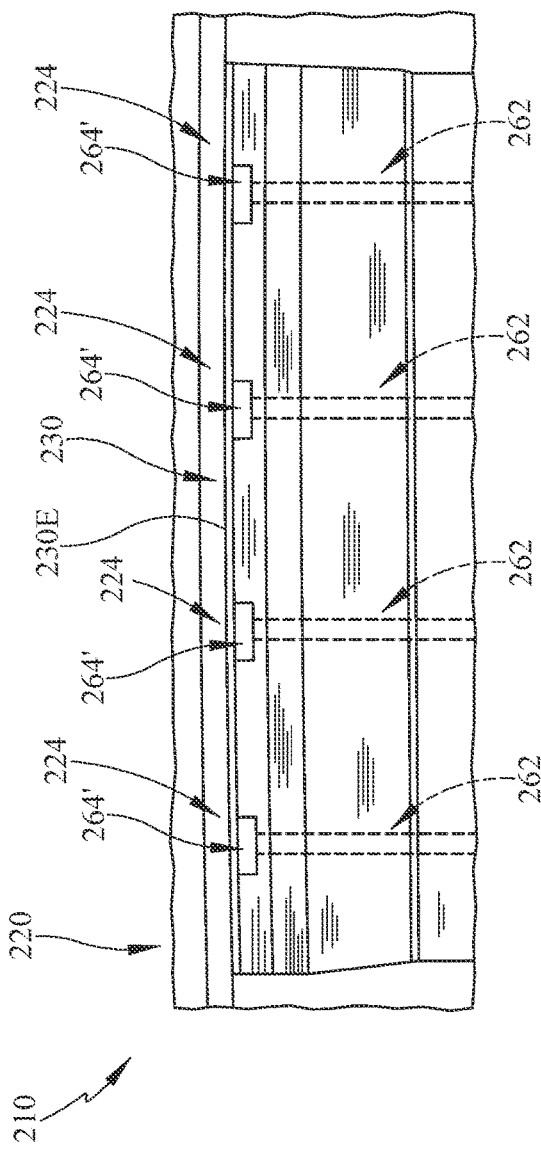

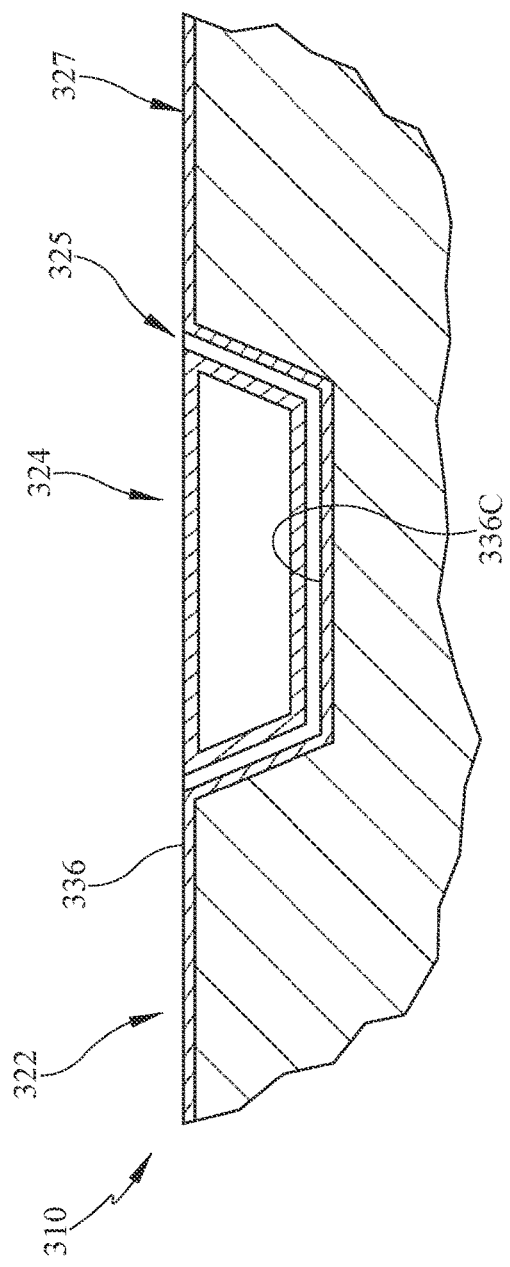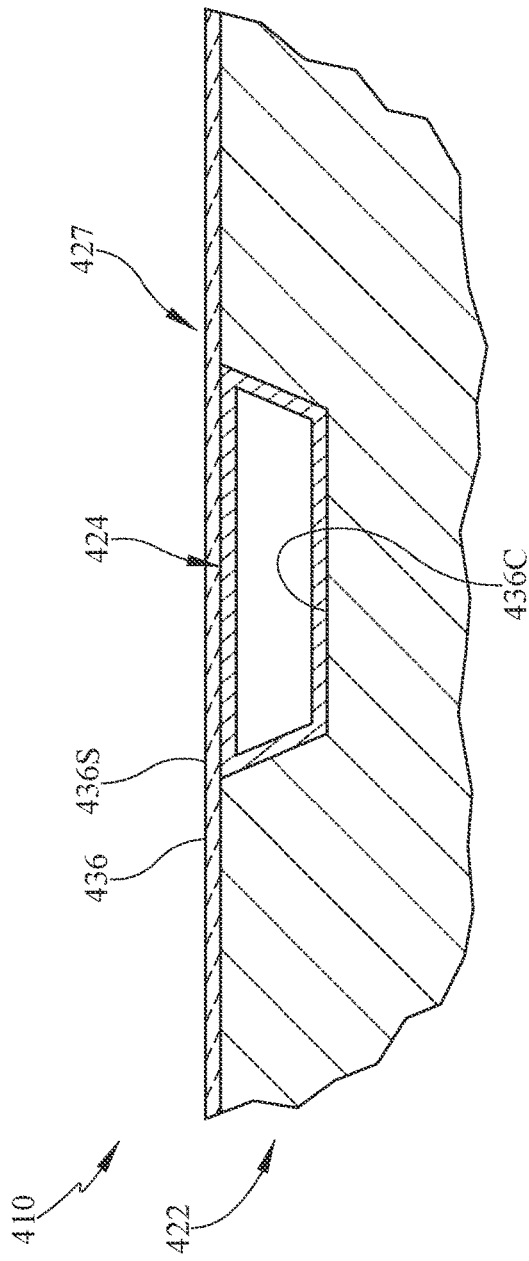

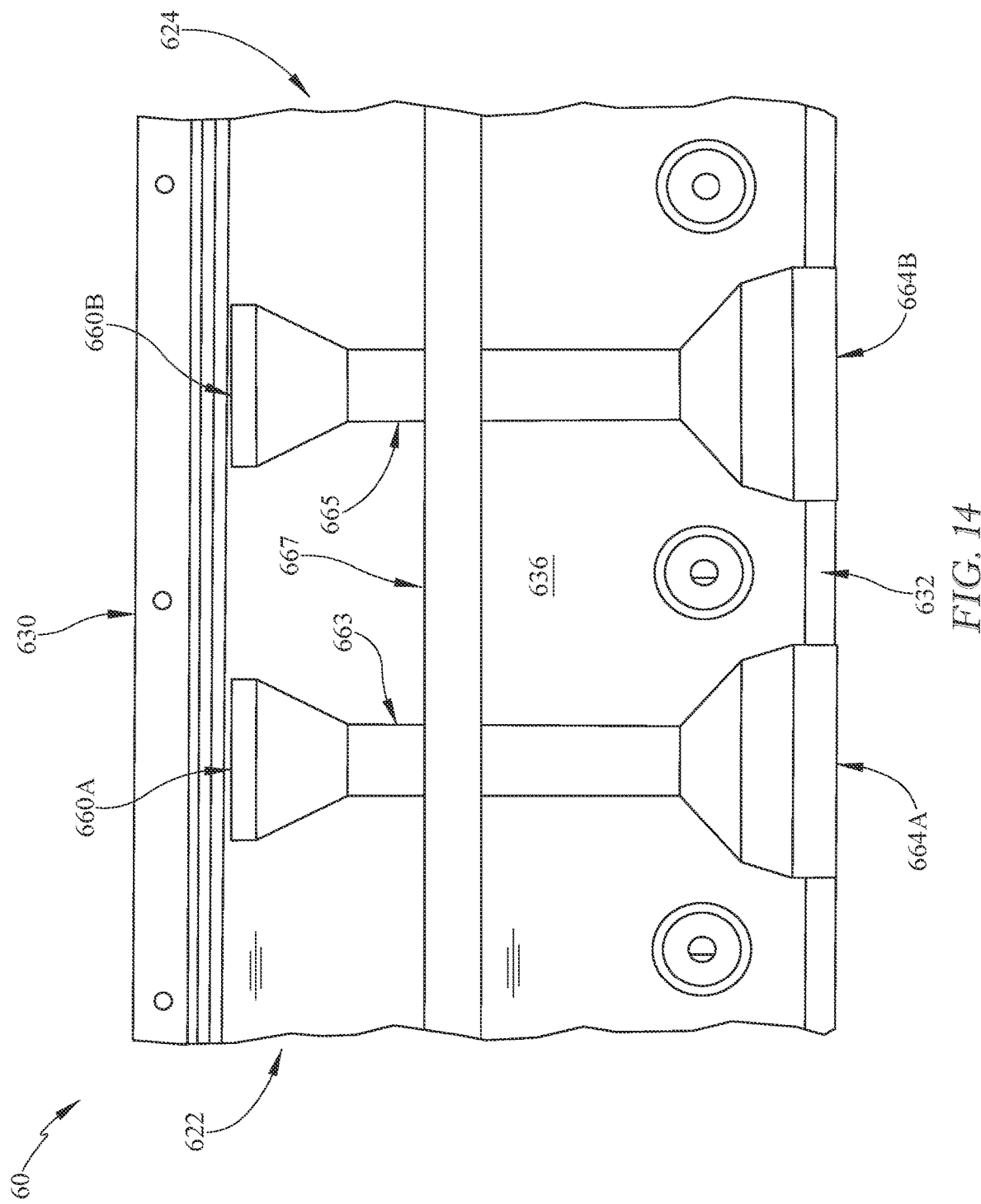

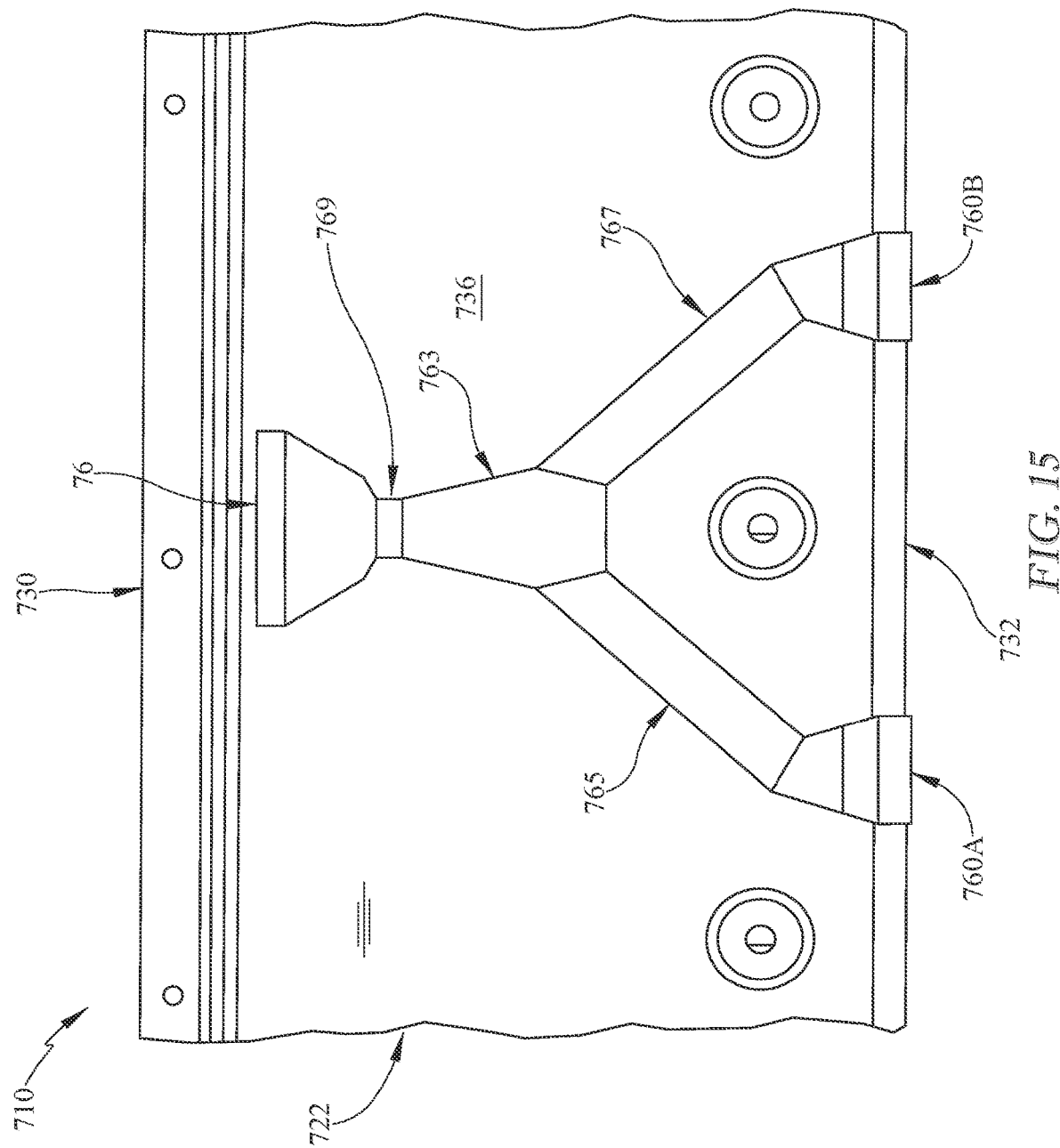

TURBINE ENGINE FAN TRACK LINER WITH TIP INJECTION AIR RECIRCULATION PASSAGE

STATEMENT REGARDING FEDERALLY SPONSORED RESEARCH OR DEVELOPMENT

Embodiments of the present disclosure were made with government support under Contract No. FA865019F2078. The government may have certain rights.

FIELD OF THE DISCLOSURE

The present disclosure relates generally to gas turbine engines, and more specifically to fan track liners for gas turbine engines.

BACKGROUND

Gas turbine engines used in aircraft often include a fan assembly that is driven by an engine core to push air through the engine and provide thrust for the aircraft. A typical fan assembly includes a fan rotor having blades and a fan case that extends around the blades of the fan rotor. During operation, the fan blades of the fan rotor are rotated to push air through the engine. The fan case both guides the air pushed by the fan blades and provides a protective band that blocks fan blades from escaping out of the fan assembly in case of a blade-off event in which a fan blade is released from the fan rotor.

Fan cases sometimes include metallic shrouds and liners positioned between the metallic shroud and the fan blades. Liners may be coupled to metallic shrouds by hanger features that extend from the metallic shrouds, by adhesives that provide a permanent bond to the metallic shrouds, or by fasteners/through bolts bolted directly to the case. Fan cases may also provide containment functions in case of a blade-off event. The containment function of the fan cases may make it difficult to incorporate other features into the fan case, while still maintaining the structural integrity of the fan case system.

SUMMARY

The present disclosure may comprise one or more of the following features and combinations thereof.

A fan case assembly adapted for use with a gas turbine engine may include a fan track liner, an annular case, and an air recirculation duct. The fan track liner may extend circumferentially at least partway about a central axis of the gas turbine engine. The annular case may be configured to support the fan track liner at a radial position relative to the central axis. The air recirculation duct may be configured to direct a portion of gases flowing through a gas path of the gas turbine engine near an aft end of the fan track liner into the gas path near a forward end of the fan track liner.

In some embodiments, the fan track liner may include a forward end, an aft end, and an inner radial surface. The aft end may be spaced apart axially from the forward end. The inner radial surface may extend between the forward end and the aft end to define the gas path of the gas turbine engine.

In some embodiments, the annular case may include an outer wall and a hook. The outer wall may extend circumferentially around the central axis of the gas turbine engine. The hook may extend radially inward from the outer wall to support the forward end of the fan track liner.

In some embodiments, the air recirculation duct may include an extraction port, a conduit, and an injection port. The extraction port and the injection port may be in fluid communication with the gas path of the gas turbine engine. The extraction port may extend radially outward from the gas path at a location near the aft end of the fan track liner. The conduit may be in fluid communication with the extraction port. The conduit may extend axially forward from the extraction port toward the forward end of the fan track liner. The conduit may be located radially inward of the outer wall. The injection port may extend radially inward from the conduit toward the gas path at a location near the forward end of the fan track liner and the hook of the annular case.

In some embodiments, the fan track liner may include a first fan track liner segment and a second fan track liner segment. The second fan track liner segment may be arranged in circumferentially confronting relation to the first fan track liner segment. The air recirculation duct may be located circumferentially between the first and second fan track liner segments.

In some embodiments, the injection port may open into the gas path axially aft of the hook. In some embodiments, the injection port may open into the gas path circumferentially between the first fan track liner segment and the second fan track liner segment axially aft of the forward end of the first and second fan track liner segments. In some embodiments, the extraction port may open into the gas path axially aft of the aft end of the first and second fan track liner segments.

In some embodiments, the air recirculation duct may have one of a circular cross-section, an oblong cross-section, a rectangular cross-section, and a trapezoidal cross-section when viewed in an axial direction. In some embodiments, the air recirculation duct may have a circular cross-section when viewed in an axial direction. In some embodiments, the air recirculation duct may have an oblong cross-section when viewed in an axial direction. In some embodiments, the air recirculation duct may have a rectangular cross-section when viewed in an axial direction. In some embodiments, the air recirculation duct may have a trapezoidal cross-section when viewed in an axial direction.

In some embodiments, the fan track liner further may include an outer radial surface. The outer radial surface may be spaced radially outward of the inner radial surface. The outer radial surface may extend between the forward end and the aft end of the fan track liner. The conduit of the air recirculation duct may be located radially inward of the outer radial surface of the fan track liner.

In some embodiments, the fan track liner and the air recirculation duct may comprise composite materials. The air recirculation duct may be molded with the fan track liner in the channel to form an integral, single piece component.

In some embodiments, the injection port may open into the gas path axially aft of the forward end of the fan track liner. In some embodiments, the extraction port may open into the gas path axially forward of the aft end of the fan track liner In some embodiments, the conduit of the air recirculation duct may extend axially between the extraction port and the injection port relative to the central axis of the gas turbine engine. In some embodiments, the conduit of the air recirculation duct may extend axially and circumferentially between the extraction port and the injection port relative to the central axis of the gas turbine engine.

According to another aspect of the present disclosure, a fan case assembly adapted for use with a gas turbine engine may include a fan track liner, an annular case, and an air recirculation duct. The fan track liner may extend circumferentially at least partway about a central axis of the gas turbine engine. The annular case may be coupled with the fan track liner to support the fan track liner radially in the gas turbine engine.

In some embodiments, the fan track liner may include a forward end, an aft end, and an inner radial surface. The aft end may be spaced apart axially from the forward end. The inner radial surface may extend between the forward end and the aft end to define a gas path of the gas turbine engine.

In some embodiments, the air recirculation duct may include an extraction port, a conduit, and an injection port. The extraction port and the injection port may be in fluid communication with the gas path of the gas turbine engine. The extraction port may extend radially from the gas path at a location near the aft end of the fan track liner. The conduit may extend axially from the extraction port radially inward of the annular case. The injection port may extend radially from the conduit at a location near the forward end of the fan track liner In some embodiments, the fan track liner includes a first fan track liner segment and a second fan track liner segment arranged in circumferentially confronting relation to the first fan track liner segment, and the air recirculation duct is located circumferentially between the first and second fan track liner segments.

In some embodiments, the injection port may open into the gas path circumferentially between the first fan track liner segment and the second fan track liner segment. The injection port may open into the gas path circumferentially between the first and second fan track liners axially aft of the forward end of the first and second fan track liner segments. In some embodiments, the extraction port may open into the gas path axially aft of the aft end of the first and second fan track liner segments.

In some embodiments, the air recirculation duct may have one of a circular cross-section, an oblong cross-section, a rectangular cross-section, and a trapezoidal cross-section when viewed in an axial direction. In some embodiments, the air recirculation duct may have a circular cross-section. In some embodiments, the air recirculation duct may have an oblong cross-section. In some embodiments, the air recirculation duct may have a rectangular cross-section. In some embodiments, the air recirculation duct may have a trapezoidal cross-section.

In some embodiments, the fan track liner may further include an outer radial surface. The outer radial surface may be spaced radially outward of the inner radial surface. The outer radial surface may extend between the forward end and the aft end of the fan track liner. The conduit of the air recirculation duct may be located radially inward of the outer radial surface of the fan track liner.

In some embodiments, the conduit of the air recirculation duct may extend axially between the extraction port and the injection port relative to the central axis of the gas turbine engine. In some embodiments, the conduit of the air recirculation duct may extend axially and circumferentially between the extraction port and the injection port relative to the central axis of the gas turbine engine.

According to another aspect of the present disclosure, a method may include providing a fan track liner, an annular case, and an air recirculation duct. The fan track liner may extend circumferentially at least partway about a central axis. The annular case may extend around the central axis.

In some embodiments, the fan track liner may include a forward end, an aft end, an inner radial surface, and an outer radial surface. The aft end may be spaced apart axially from the forward end. The inner and outer radial surfaces may extend between the forward end of the fan track liner and the aft end of the fan track liner.

In some embodiments, the air recirculation duct may include an extraction port, an injection port, and a conduit. The conduit may extend between and interconnect the extraction port and the injection port.

In some embodiments, the method may further include arranging the air recirculation duct adjacent the fan track liner. The air recirculation duct may be arranged adjacent the fan track liner so that the injection port is located near the forward end of the fan track liner and the extraction port is located near to the aft end of the fan track liner.

In some embodiments, the method may further include coupling the fan track liner to the annular case. The fan track liner may be coupled to the annular case so that the air recirculation duct is located radially inward of the annular case.

In some embodiments, the fan track liner may include a first fan track liner segment and a second fan track liner segment. The method may further include arranging second fan track liner in circumferentially confronting relation to the first fan track liner segment to locate the air recirculation duct circumferentially therebetween.

These and other features of the present disclosure will become more apparent from the following description of the illustrative embodiments.

BRIEF DESCRIPTION OF THE DRAWINGS

FIG. 3A is a detail view of FIG. 3 showing the injection port opens into the gas path circumferentially between the first fan track liner segment and the second fan track liner segment axially aft of a forward end of the first and second fan track liner segments;

FIG. 3B is a detail view of FIG. 3 showing the extraction port opens into the gas path circumferentially between the first fan track liner segment and the second fan track liner segment axially aft of an aft end of the first and second fan track liner segments, and further showing the fan case assembly may further include a valve coupled to an opening end of the extraction port that is configured to vary a flow of gases through the extraction port to control the flow of gases through the air recirculation duct;

FIG. 6 is a cross-section view of the fan case assembly of FIG. 2 showing the air recirculation duct has a circular cross-section when viewed in an axial direction relative to the central axis;

FIG. 7 is cross-section view of the fan case assembly of FIG. 2 showing another embodiment of the air recirculation duct that has a trapezoidal cross-section when viewed in an axial direction relative to the central axis;

FIG. 10 is a view of the fan case assembly of FIG. 8 showing that another embodiment of the air recirculation ducts includes injection ports each spaced axially aft of the forward end of the fan track liner;

FIG. 10A is a view of the fan case assembly of FIG. 8 showing that another embodiment of the air recirculation ducts includes injection ports each aligned with the forward end of the fan track liner and abutting the hook of the annular case;

FIG. 11 is another embodiment of a fan case assembly included in the gas turbine engine of FIG. 1 showing the fan case assembly includes a fan track liner and an air recirculation duct each comprising composite materials;

FIG. 12 is another embodiment of a fan case assembly included in the gas turbine engine of FIG. 1 showing the fan case assembly includes a fan track liner and an air recirculation duct each comprising composite materials, and further showing the fan track liner includes an outer ply that covers the air recirculation duct to provide a smooth outer surface;

FIG. 14 is an elevation view of another embodiment of a fan case assembly for the gas turbine engine of FIG. 1 looking radially inward from radially outward of a fan track liner included in the fan case assembly showing an air recirculation duct included in the fan case assembly includes extraction ports spaced apart circumferentially from each other, injection ports spaced apart circumferentially from each other, and a manifold that extends circumferentially part way about the axis between the extraction ports and the injection ports so as to put the extraction ports and injection ports in fluid communication with each other; and FIG. 15 is an elevation view of another embodiment of a fan case assembly for the gas turbine engine of FIG. 1 looking radially inward from radially outward of a fan track liner included in the fan case assembly showing an air recirculation duct included in the fan case assembly includes extraction ports spaced apart circumferentially from each other, an injection port located circumferentially between the extraction ports, and a manifold that is in fluid communication between the extraction ports and the injection port to feed the air directed out of the gas path by the extraction ports to the single injection port.

DETAILED DESCRIPTION OF THE DRAWINGS

Figures 1, 2:
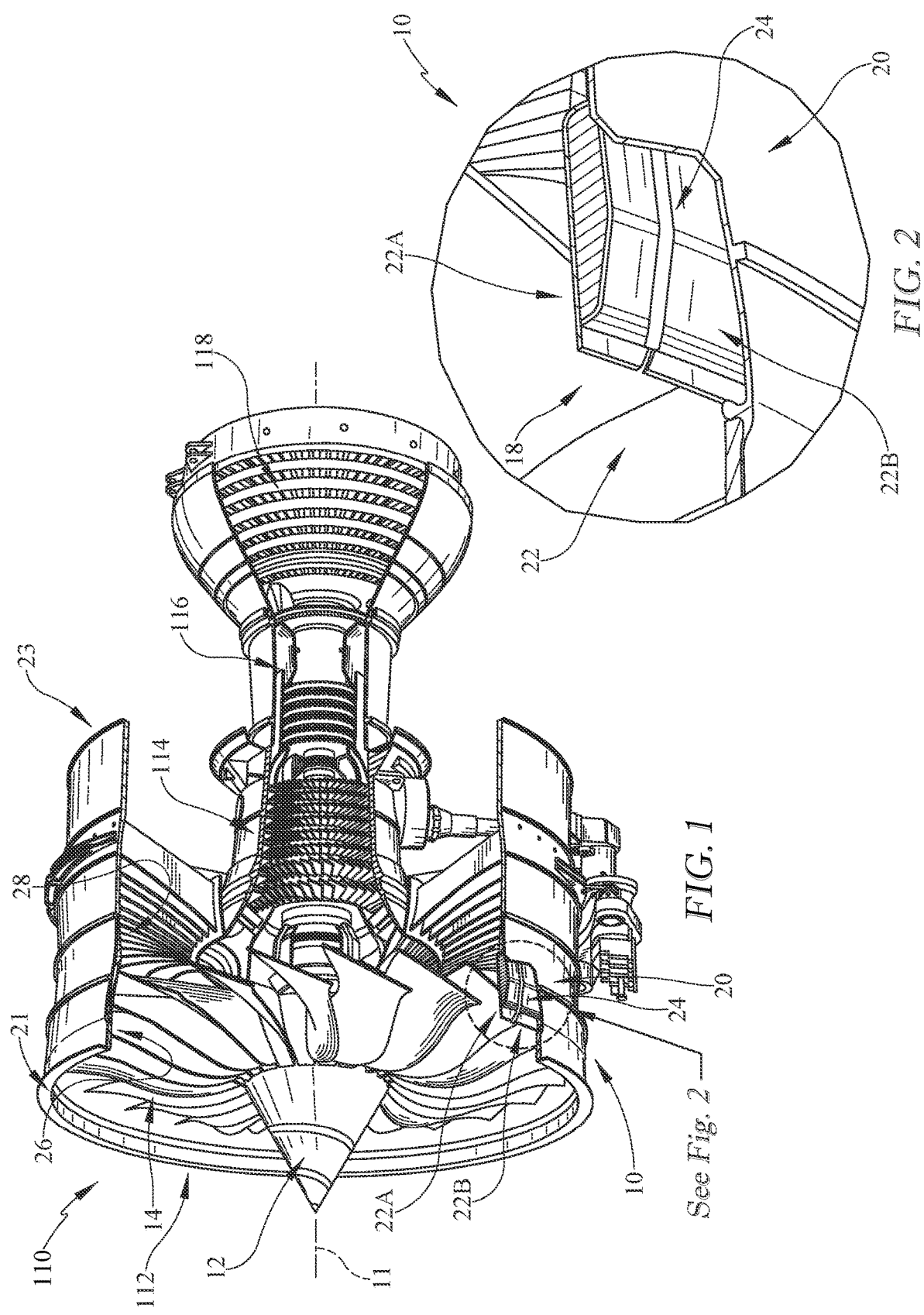
FIG. 1 is a cutaway view of a gas turbine engine that includes a fan, a compressor, a combustor, and a turbine, the fan including fan rotor configured to rotate about an axis of the engine and a fan case that surrounds fan blades included in the fan rotor and showing that the fan case assembly includes an annular carrier and a fan track liner formed by a number of liner segments positioned between the fan blades and the annular carrier.
FIG. 2 is an enlarged view of the fan case assembly included in the gas turbine engine of FIG. 1 showing the fan case assembly further includes an air recirculation duct located circumferentially between adjacent liner segments that is configured to direct a portion of gases flowing through the gas path of the gas turbine engine from an aft end of the fan track liner into the gas path axially forward of a forward end of the fan track liner.

For the purposes of promoting an understanding of the principles of the disclosure, reference will now be made to a number of illustrative embodiments illustrated in the drawings and specific language will be used to describe the same.

A fan case assembly 10 is adapted for use in a gas turbine engine 110 as shown in FIG. 1. The gas turbine engine 110 includes a fan 112, a compressor 114, a combustor 116, and a turbine 118 as shown in FIG. 1. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about an axis 11 of the gas turbine engine 110 and drive the compressor 114 and the fan 112.

The fan 112 includes a fan rotor 12 and a fan case assembly 10 as shown in FIG. 1. The fan rotor 12 has a number of fan blades 14. The fan case assembly 10 extends circumferentially around the fan blades 14 of the fan rotor 12 such that the fan case assembly 10 is aligned axially with the fan blades 14.

The fan case assembly 10 includes, among other components, an annular case 20, a fan track liner 22, and an air recirculation duct 24 as shown in FIGS. 1-4. The annular case 20 is configured to support the fan track liner 22 at a radial position relative to a central axis 11 of the gas turbine engine 110. The fan track liner 22 extends circumferentially at least partway about the central axis 11 of the gas turbine engine 110 and defines a portion of a gas path 18 of the gas turbine engine 110. The air recirculation duct 24 is configured to direct a portion of gases flowing through the gas path 18 of the gas turbine engine 110 from an aft end 32 of the fan track liner 22 into the gas path 18 axially forward of a forward end 30 of the fan track liner 22.

Figure 4:
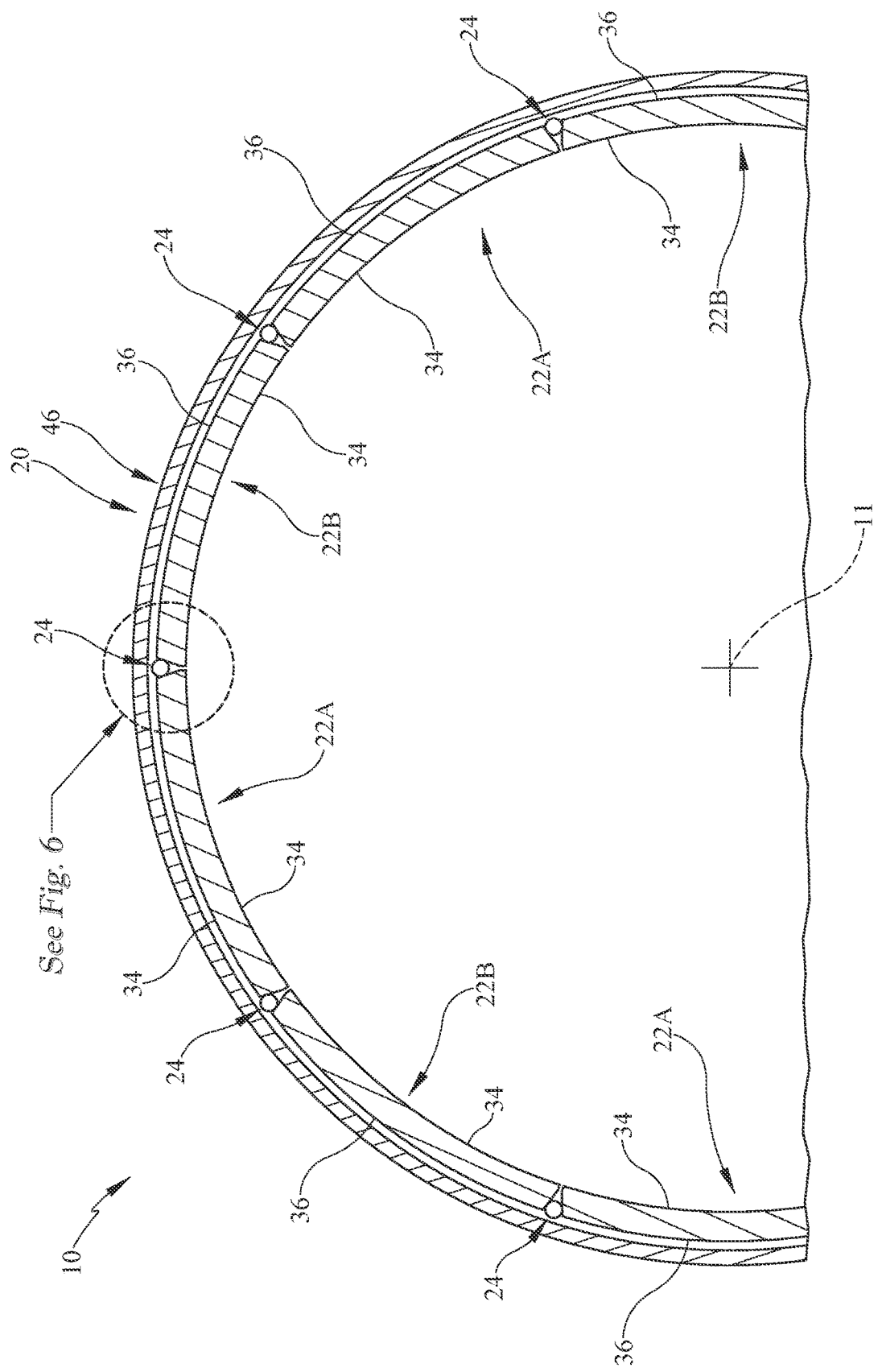
FIG. 4 is cross-section view of the gas turbine engine of FIG. 1 showing the fan case assembly includes a plurality of air recirculation ducts spaced apart circumferentially about the central axis between each of adjacent fan track liner segments included in the fan case assembly.

The air recirculation duct 24 includes an extraction port 60, a conduit 62, and an injection port 64 as shown in FIGS. 2 and 4. In some embodiments, the ports 60, 64 and conduit 62 are integrally formed as a single, one-piece component. In other embodiments, the ports 60, 64 and conduit 62 are individual or even several components each that are coupled together. Both the extraction port 60 and the injection port 64 are in fluid communication with the gas path 18 of the gas turbine engine 110, while the conduit 62 is in fluid communication with the extraction and injection ports 60, 64. The extraction port 60 extends radially outward from the gas path 18 at a location near the aft end 32 of the fan track liner 22. The conduit 62 extends axially forward from the extraction port 60 toward the forward end 30 of the fan track liner 22 to the injection port 64. The injection port 64 extends radially inward from the conduit 62 toward the gas path 18 at a location near the forward end 30 of the fan track liner 22.

The conduit 62 is located radially inward of the annular case 20 and radially outward of a radially-inwardly facing surface of the fan track liner 22 which defines a portion of the gas path 18 as shown in FIGS. 2 and 4. The extraction port 60 and the injection port 62 extend radially inward to open into the gas path 18. In this way, a portion of gases flowing through the gas path 18 is directed from the aft end 32 of the fan track liner 22 radially outward of the fan track liner 22, axially forward toward the forward end 30 of the liner 22, and radially inward back into the gas path 18 near the forward end 30 of the fan track liner 22. No portion of the air recirculation duct 24 extends through the annular case 20.

In the illustrative embodiment, the fan case assembly 10 includes a plurality of air recirculation ducts 24 as shown in FIG. 1. The air ducts 24 are spaced apart circumferentially about the axis 11. The number of air recirculation ducts 24 may depend on the size of the engine 110 or on the stall margin improvement the engine 110 may use. If the engine 110 has a larger stall margin requirement, the number of air recirculation ducts 24 may be increased and vice versa.

Turning again to the fan case assembly 10, the fan case assembly 10 includes the annular case 20, the fan track liner 22, the air recirculation ducts 24, and acoustic panels 26, 28 as shown in FIGS. 2 and 4. The fan track liner 22 is formed by a number of liner segments 22A, 22B in the illustrative embodiment. The acoustic panels 26, 28 are located forward and aft of the fan track liner 22.

The liner segments 22 and the acoustic panels 26, 28 are coupled to the annular case 20 as shown in FIG. 4. The forward acoustic panel 26 is coupled to the annular case 20 axially forward of the liner 22. The aft acoustic panel 28 is coupled to the annular case 20 axially aft of the liner 22.

Each of the segments 22A, 22B are arranged in circumferentially confronting relation to each other. The second fan track liner 22B is arranged in circumferentially confronting relation to the first fan track liner 22A and one of the air recirculation ducts 24 is located circumferentially between the first and second track liners 22A, 22B. In the illustrative embodiment, an air recirculation duct 24 is located between each circumferentially adjacent segments 22A, 22B and the injection port 64 opens into the gas path 18 circumferentially between the first fan track liner segment 22A and the second fan track liner segment 22B.

Each liner segment 22 includes a forward end 30, an aft end 32 spaced apart axially from the forward end 30, inner and outer radial surfaces 34, 36, a first circumferential end 38, and a second circumferential end 40 spaced apart circumferentially from the first circumferential end 38 as shown in FIGS. 2 and 4. The inner and outer radial surfaces 34, 36 extend axially between the forward end 30 and the aft end 32 and circumferentially between the first and second circumferential ends 38, 40. The inner radial surface 34 defines a portion of the gas path 18 of the gas turbine engine 110. In the illustrative embodiment, the acoustic panels 26, 28 define portions of the gas path 18 of the gas turbine engine 110 axially forward and aft of the fan track liner 22 as shown in FIGS. 2 and 4.

The first and circumferential ends 38, 40 define chamfer surfaces 42, 44 as shown in FIG. 6. The first circumferential end 38 forms a first chamfer surface 42 and the second circumferential end 40 forms a second chamfer surface 44. In the illustrative embodiment, the first circumferential end 38 of the first segment 22A is arranged in circumferentially confronting relation to the second circumferential end 40 of the second segment 22B so that the first and second chamfer surfaces 42, 44 face each other.

The conduit 62 is arranged between the adjacent chamfer surfaces 42, 44 as shown in FIGS. 4 and 6. The conduit 62 has a circular cross-section in the illustrative embodiment. In other embodiments, the conduit 62 may have a different shape, such as a rectangle. In other embodiments, the conduit 62 may have an oblong cross-section.

The circular cross-section duct 24 may have supports 71 attached to the duct 24 to secure the duct 24 in place relative to the liner 22. The supports 71 may engage the annular case 20.

In another embodiment, the air recirculation duct 24 has a conduit 62' with a molded a shape to fit the space between the liners 22A, 22B as shown in FIG. 7. The shape of the conduit 62' fills the gap between the adjacent segments 22A, 22B.

In the illustrative embodiment, the shape of the conduit 62' has a generally trapezoidal cross-section. A first side 63' of the conduit 62' faces the first chamfer surface 42, while the other side 65' faces the second chamfer surface 44. One of the sides 63', 65' faces of the conduit 62' may be engaged with the chamfer surface 42, 44. An outer radial surface 67' extends between the sides 63', 65', while an inner radial surface 69' spaced radially inward of the outer radial surface 67' extends between the sides 63', 65.

Figure 3:
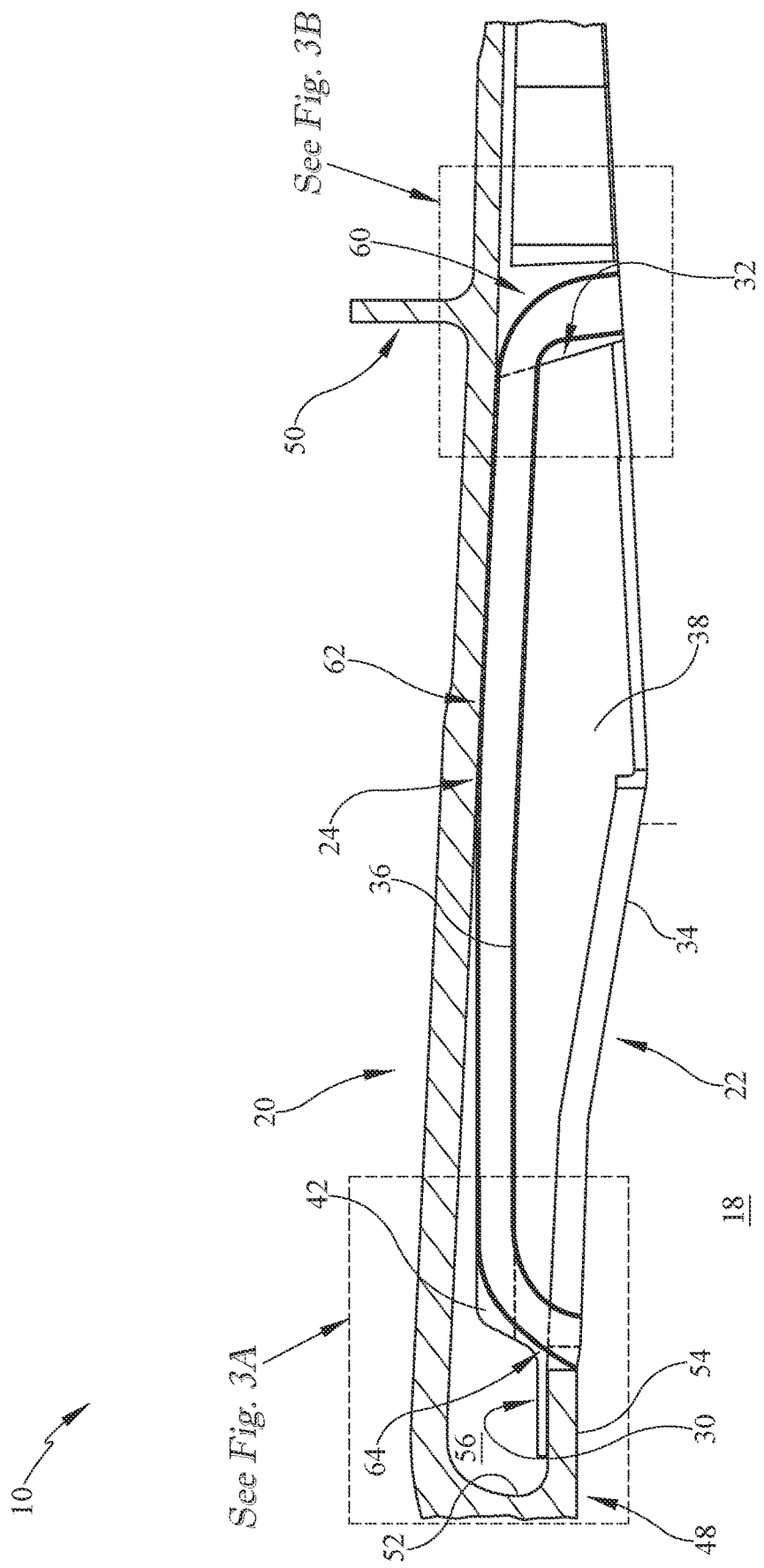
FIG. 3 is cross-section view of the fan case assembly of FIG. 2 showing the air recirculation duct includes an extraction port in fluid communication with the gas path of the gas turbine engine axially aft of the blades, an injection port in fluid communication with the gas path of the gas turbine engine axially forward of the blades, and a conduit that extends between and interconnects the extraction port and the injection port, and further showing the air recirculation duct is located radially inward of the annular case and radially outward of an inner radial surface of the fan track liner.

The annular case 20 includes the outer wall 46, a hook 48, and a flange 50 as shown in FIGS. 2-3B. The outer wall 46 extends circumferentially around the central axis 11 of the gas turbine engine 110. The hook 48 extends radially inward from the outer wall 46 to support the forward end 30 of the fan track liner 22. The flange 50 extends radially outward from the outer wall 46 axially aft of the hook 48. In the illustrative embodiment, the fan track liner 22 is coupled to the outer wall 46 near the aft end 32 of the fan track liner 22 with a fastener to support the aft end 32 of the fan track liner 22.

In the illustrative embodiment, the annular case 20 extends between a forward end 21 and an aft end 23 as shown in FIG. 1. The aft end 23 is spaced apart axially from the forward end 21.

The hook 48 includes a radially-extending flange 52 and an axially-extending flange 54 as shown in FIGS. 3 and 4. The radially-extending flange 52 extends radially inward form the outer wall 46. The axially-extending flange 54 extends axially aft away from the radially-extending flange 52 at a location radially spaced apart from the outer wall 46 to form an axially opening channel 56 as shown in FIG. 3.

The axially-extending flange 54 engages the fan track liner 22 to support the fan track liner 22 at the forward end 30 of the fan track liner 22 as shown in FIG. 3. The forward end 30 of the fan track liner 22 extends into the axially opening channel 56.

In the illustrative embodiment, the extraction port 60 is located axially between the aft end 32 of the fan track liner 22 and the forward end of the acoustic panel 28. The extraction port 60 is axially aligned with the flange 50 of the case 20.

In the illustrative embodiment, the injection port 64 opens into the gas path 18 axially aft of the hook 48. The injection port 64 abuts the axially-extending flange 54.

The conduit 62 extends between a forward end 66 and an aft end 68 as shown in FIG. 3. The extraction port 60 extends radially inward and axially forward from the aft end 68 of the conduit 62 such that the aft end 68 forms a bend or curve.

The injection port 64 extends radially inward and axially aft from the forward end 66 of the conduit 62 such that the forward end 66 forms a bend or curve.

The extraction port 60 has an opening end 70 that faces the gas path 18 as shown in FIGS. 3 and 3B. The opening end 70 forms an opening 72 that opens into the gas path 18. In the illustrative embodiment, the opening 72 has a cross-sectional area 72D that is greater than the cross-sectional area 62D of the conduit 62.

In some embodiments, the fan case assembly 10 may further include a valve 74 as suggested in FIG. 3B. The valve 74 may be coupled to the opening end 70 of the extraction port 60 of the air recirculation duct 24. The valve 74 may be configured to vary a flow of gases through the extraction port 60.

The valve 74 may be a butterfly valve configured to change between a closed position (represented as 74') and an open position (represented as 74) to control the flow of gases directed out of the gas path 18 into the air recirculation duct 24. In the closed position, the valve 74' extends across the extraction port 60 to block an opening 72 in the opening end 70 of the extraction port 60 and prevent the flow of gases through the extraction port 60. In the open position, the valve 74 has rotated about the pivot point 75 so as to be spaced apart from the opening 72 and allow the flow of gases through the extraction port 60.

In the open position, the valve 74 may be flush with the gas path 18 as suggested in FIG. 3B. In other embodiments, the valve 74 may extend into the gas path 18 when in the open position.

The valve 74 may include a scoop 76 as suggested in FIG. 3B. The scoop 76 is configured to change between a retracted position (represented as 76') and an extended position (represented as 76) to control the flow of gases directed out of the gas path 18 into the air recirculation duct 24.

In the retracted position, the scoop 76' extends into the extraction port 60 and is flush with the gas path 18 so as not to extend into the gas path 18. In the extended position, the scoop 76 has moved to extend into the gas path 18 to direct a portion of the gases flowing through the gas path 18 toward the opening 72 of the extraction port 60.

In some embodiments, the scoop 76 translated radially between the retracted position and the extended position. In the illustrative embodiment, the scoop 76 pivots about the pivot point 77 between the retracted position and the extended position.

In other embodiments, the valve 74 may be a flap configured to change between a closed position and an open position to control the flow of gases directed out of the gas path 18 into the air recirculation duct 24. In the closed position, the flap blocks the opening 72 of the extraction port 60 to prevent the flow of gases through the extraction port 60. The flap extends over the opening 72 to block the flow of gases through the extraction port 60. In the open position, the flap is spaced apart from the opening 72 of the opening end 70 of the extraction port 60 and extends into the gas path 18 to direct a portion of the gases flowing through the gas path 18 toward the opening 72 of the extraction port 60.

The injection portion 64 has an opening end 78 that opens into the gas path 18 as shown in FIG. 4. The opening end 78 forms an opening 80 that opens into the gas path 18. The opening end 78 is located axially aft of the hook 40 such that the opening end 78 extends through a portion of the fan track liner 22. In the illustrative embodiment, the opening end 78 is located axially aft of the axially-extending flange 46 of the hook 40.

In the illustrative embodiment, the opening 80 of the injection port 64 is rectangular in cross-section and has a thickness 80D as shown in FIG. 3A. The thickness 80D may be a different size compared to the area 62D of the conduit 62. The thickness 80D of the opening 80 may be varied to control the flow of gases injected in the gas path 18. In other embodiments, the opening 80 of the injection port 64 may be an elongated oval in cross section. The area of the injection port 64 is less than the area 62D of the conduit 62.

Figure 5:
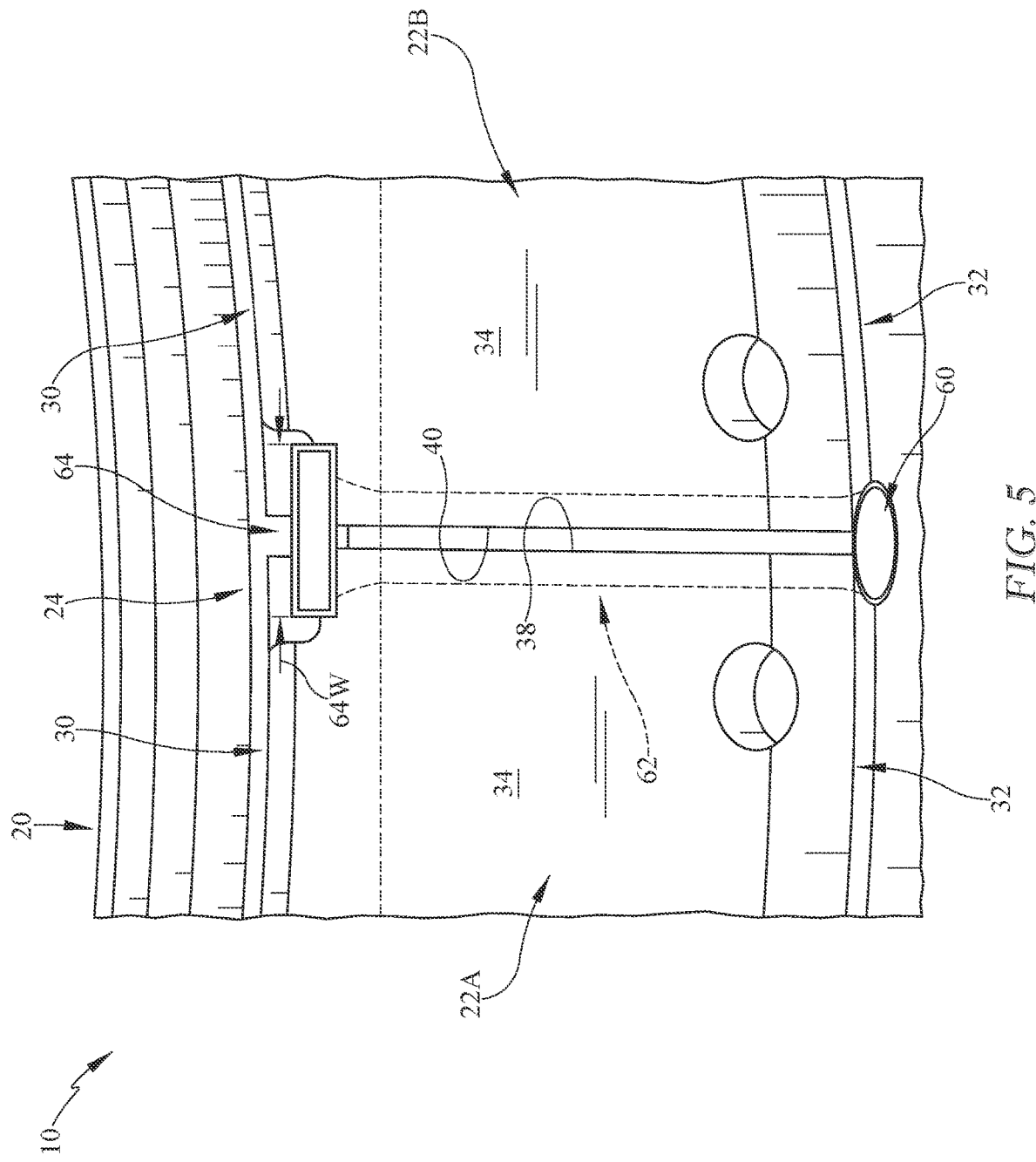
FIG. 5 is a view of the fan case assembly of FIG. 2 showing the air recirculation duct between the liner segments with the injection port and the extraction port open between the liner segments.
Figure 9:
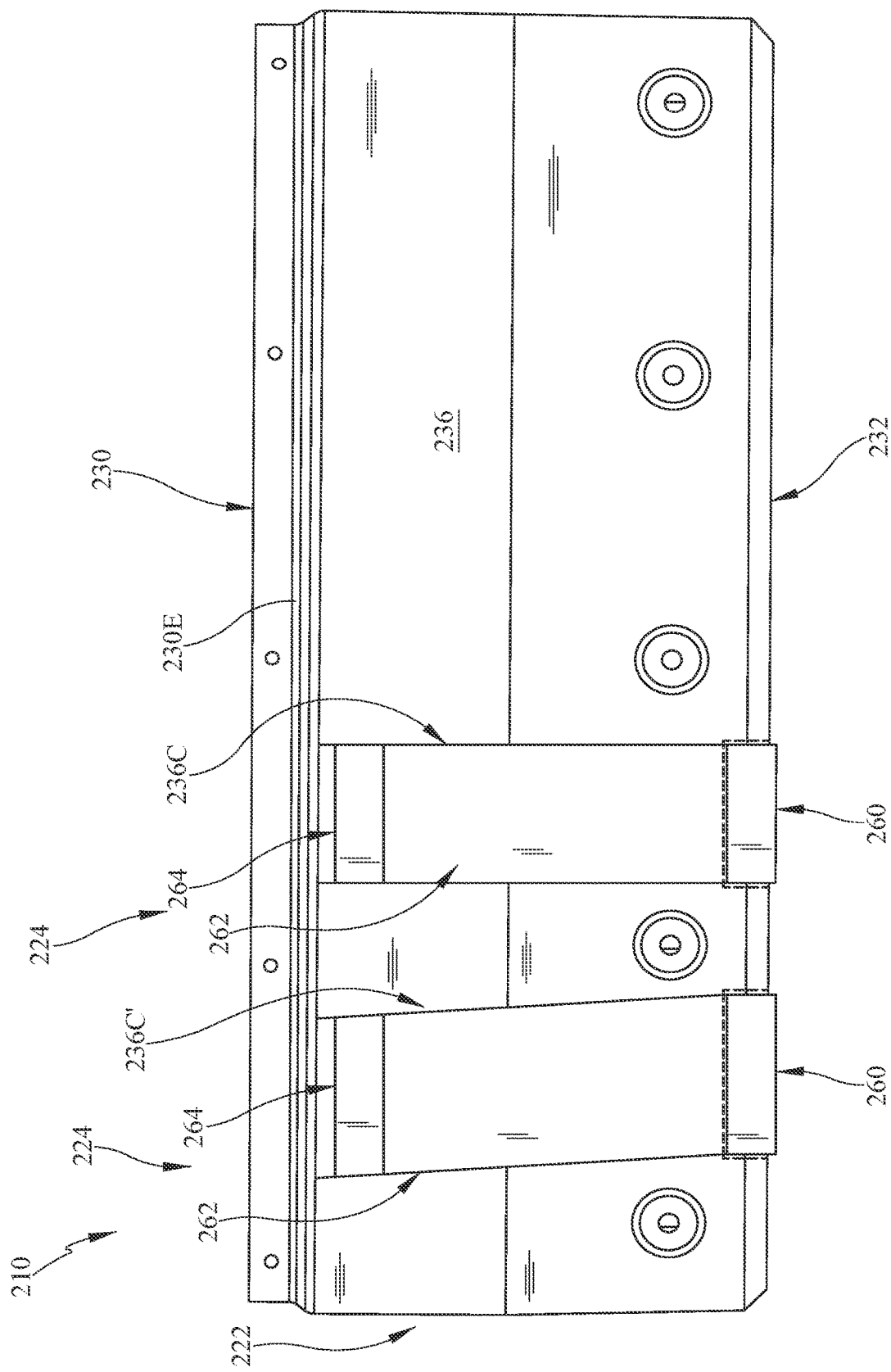
FIG. 9 is a view of the fan case assembly of FIG. 8 showing the fan track liner is molded with a plurality of channels and the fan case assembly includes a plurality of air recirculation ducts that each have an injection port that opens into the gas path axially aft of a forward end of the fan track liner.

In the illustrative embodiment, the injection port 64 extends circumferentially part way about the axis 11 has a circumferential width 64W as shown in FIG. 9. An edge cutout is formed at the forward end 30 of the liners 22A, 22B and the injection port 64 extends therethrough as shown in FIG. 5. Space around the injection port 64 would then be filled in with abradable material.

A method of assembling and using the fan case assembly 10 may include several steps. The method includes arranging the air recirculation duct 24 adjacent to annular case 20 radially inward of the outer wall 38. The air recirculation duct 24 is arranged adjacent to the annular case 20 so that the injection port 64 is adjacent to and axially aft of the hook 48 and the extraction port is axially aft of the injection port 64.

With the air recirculation duct 24 in place, the method continues by coupling the fan track liner 22 to the annular case 20 so that the air recirculation duct 24 is located radially between the fan track liner 22 and the annular case 20. The fan track liner 22 is coupled to the case 20 by extending the forward end 30 into the channel 56 and engaging the hook 40 with the forward end 30 of the fan track liner 22. Additionally the forward and aft acoustic panel 26, 28 are coupled to the case 20 axially forward and aft of the fan track liner 22.

In the illustrative embodiment, the method includes coupling the first fan tack liner segment 22A to the case 20 and coupling the second fan track liner segment 22B to the case 20 so that the air recirculation duct 24 is located circumferentially between the first and second fan track liner segments 22A, 22B. In some embodiments, the method may include arranging the air recirculation duct 24 circumferentially between the first fan track liner segment 22A and the second fan track liner segment 22B and then coupling the first and second segments 22A, 22B with the air recirculation duct 24 to the case 20.

After the fan case assembly 10 is assembled, the method includes recirculating gases into the gas path 18 in the fan 112 of the gas turbine engine 110. During use of the gas turbine engine 110, a portion of the gases flowing through the gas path 18 is directed out of the gas path 18 by the extraction port 60 axially aft of the aft end 32 of the fan track liner 22. The gases flow through the opening 80 of the extraction port 60 radially outward of the fan track liner 22, but radially inward of the case 20 and are directed axially forward by the conduit 62. The gases are then directed radially inward back into the gas path 18 axially forward of the forward end 30 of the fan track liner 22.

In some embodiments, the method includes controlling the amount of gases directed out of the gas path 18 by the extraction port 60. The method may include changing the valve 74 coupled to the extraction port 60 between the open and closed positions to control the gases flowing through the air recirculation duct 24. The method may include changing the valve 74 to the open position to increase the flow of gases into the extraction port 60 and changing the valve 74 to the closed position to block the flow of gases into the extraction port 60.

Another embodiment of the fan case assembly 210 in accordance with the present disclosure is shown in FIGS. 8-10A. The fan case assembly 210 is substantially similar to the fan case assembly 10 shown in FIGS. 1-7 and described herein. Accordingly, similar reference numbers in the 200 series indicate features that are common between the fan case assembly 210 and the fan case assembly 10. The description of the fan case assembly 10 is incorporated by reference to apply to the fan case assembly 210, except in instances when it conflicts with the specific description and the drawings of the fan case assembly 210.

The fan case assembly 210 includes an annular case 220, a fan track liner 222, and an air recirculation duct 224 as shown in FIGS. 8-10A. The annular case 220 is configured to support the fan track liner 222. The fan track liner 222 extends circumferentially at least partway about the central axis 11 of the gas turbine engine 110 and defines the gas path 18 of the gas turbine engine 110. The air recirculation duct 224 is configured to direct a portion of gases flowing through the gas path 18 of the gas turbine engine 110 from an aft end 232 of the fan track liner 222 into the gas path 18 axially forward of a forward end 230 of the fan track liner 222.

Figure 8:
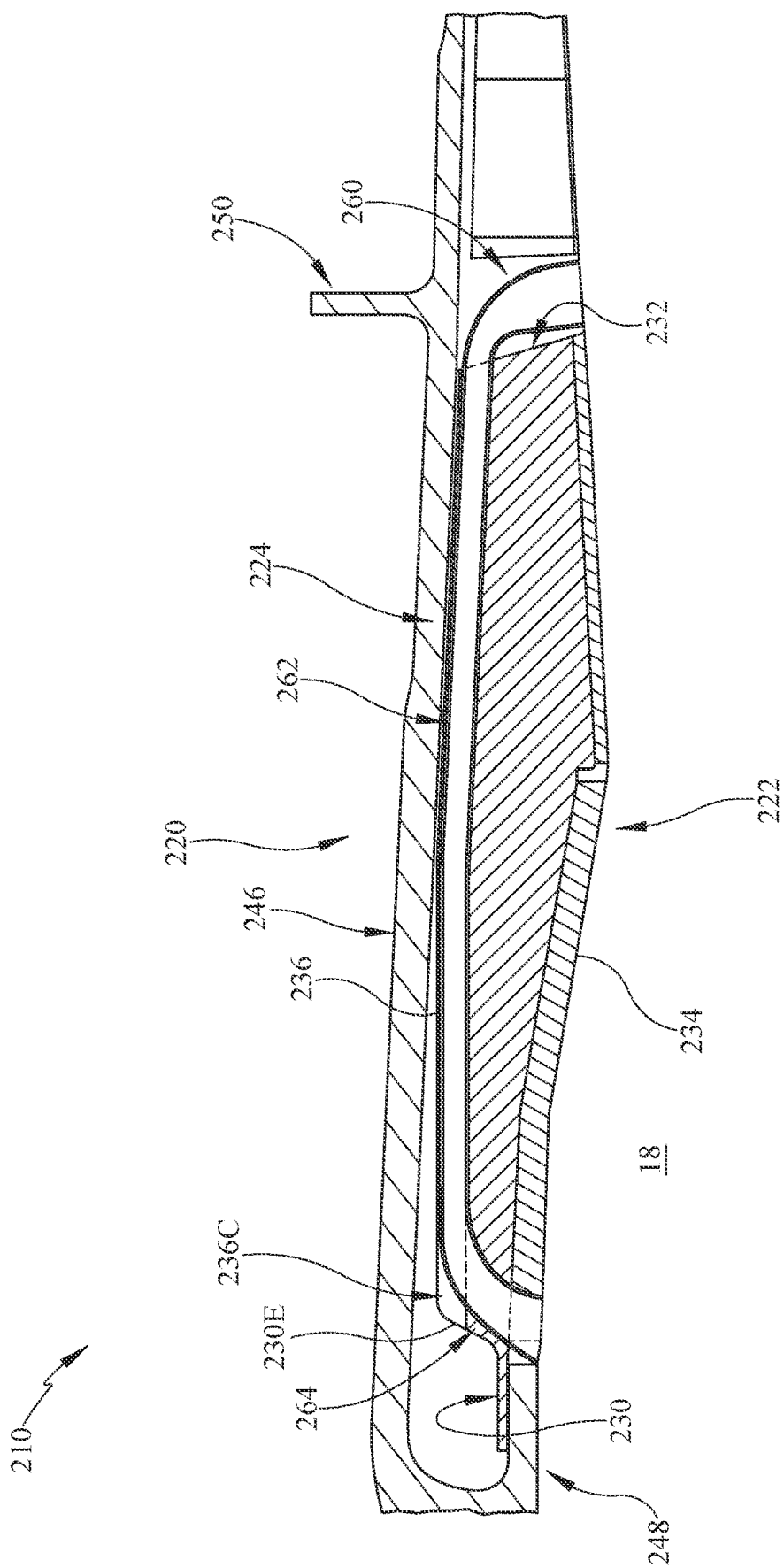
FIG. 8 is another embodiment of a fan case assembly included in the gas turbine engine of FIG. 1 showing the fan case assembly includes an annular carrier, a fan track liner molded with a channel that extends into an outer radial surface of the fan track liner; and an air recirculation duct located in the molded channel of the fan track liner.

In the illustrative embodiment, the fan track liner 222 is formed to include a channel 236C formed in an outer radial surface 236 of the fan track liner 222 as shown in FIGS. 8 and 9. The air recirculation duct 224 is located in the channel 236C so that the air recirculation duct 224 is located radially inward of the outer radial surface 236 of the fan track liner 222. In this way, the air recirculation duct 224 is integrated into the fan track liner 222 and does not need to extend through the annular case 220.

The annular case 220 includes the outer wall 246, a hook 248, and a flange 250 as shown in FIG. 8. The outer wall 246 extends circumferentially around the central axis 11 of the gas turbine engine 110. The hook 248 extends radially inward from the outer wall 246. The flange 250 extends radially outward from the outer wall 246 axially aft of the hook 248.

The fan track liner 222 includes a forward end 230, an aft end 232 spaced apart axially from the forward end 230, inner and outer radial surfaces 234, 236, a first circumferential end 238, and a second circumferential end 240 spaced apart circumferentially from the first circumferential end 238 as shown in FIGS. 8 and 9. The inner and outer radial surfaces 234, 236 extend axially between the forward end 230 and the aft end 232 and circumferentially between the first and second circumferential ends 238, 240. The inner radial surface 234 defines a portion of the gas path 18 of the gas turbine engine 110. The outer radial surface 236 is spaced radially outward of the inner radial surface 234.

In the illustrative embodiment, the air recirculation duct 224 is located radially inward of the outer radial surface 236 of the fan track liner 222 and circumferentially between the circumferential ends 238, 240 of the fan track liner 222. The channel 236C is formed in the outer radial surface 236 and the air recirculation duct 224 is located in the channel 236C so that the air recirculation duct 224 is located radially inward of the outer radial surface 236 of the fan track liner 222.

In the illustrative embodiment, the fan track liner 222 is attached/coupled to the annular case 220 using fasteners. Therefore, the channel 236C is formed between circumferentially adjacent fastener holes. For example, there may be 5-off fasteners forward and aft on the fan track liner 222. Between each pair of fasteners, a channel 236C may be molded into the liner 222 to permit one air recirculation duct 224 to be installed. This would facilitate up to four air recirculation ducts per liner segment 222.

In the illustrative embodiment, the fan case assembly 210 includes a plurality of air recirculation ducts 224 as shown in FIGS. 10 and 10A. The air ducts 24 are spaced apart circumferentially about the axis 11. In the illustrative embodiment, each fan track liner 222 may be formed with multiple channels 236C so that multiple air recirculation ducts 224 may be integrated into one fan track liner segment 222 as shown in FIG. 10.

Forming the channel 236C between circumferential fasteners permits the same overall fan case design to be utilized by different airframes with different inlets and stall margin improvement needs based on application and its distortion. This maximizes the cost savings of a common fan design, while tailoring the liners 222 and the injection ports 264 to a particular design. As operational needs or intent evolve for engines in particular applications, so can these systems change with limited cost as only the liners and channels themselves are modified.

In the illustrative embodiment, the channel 236C formed in the fan track liner 222 may extend axially through the fan track liner 222 as shown in FIG. 9. In some embodiments, the channel 236C' may extend axially and circumferentially as shown in FIG. 9.

The air recirculation duct 224 includes an extraction port 260, a conduit 262, and an injection port 264 as shown in FIGS. 8-10. Both the extraction port 260 and the injection port 264 are in fluid communication with the gas path 18 of the gas turbine engine 110, while the conduit 262 is in fluid communication with the extraction and injection ports 260, 264. The extraction port 260 extends radially outward from the gas path 18 at a location near the aft end 232 of the fan track liner 222. The conduit 262 extends axially forward from the extraction port 260 toward the forward end 230 of the fan track liner 222 to the injection port 264. The injection port 264 extends radially inward from the conduit 262 toward the gas path 18 at a location near the forward end 230 of the fan track liner 222.

The conduit 262 is located radially inward of the annular case 220 and radially outward of the radially-inwardly facing surface 234 of the fan track liner 222 which defines a portion of the gas path 18 as shown in FIGS. 8 and 9. The extraction port 260 and the injection port 264 extend radially inward to open into the gas path 18. In this way, a portion of gases flowing through the gas path 18 is directed from the aft end 232 of the fan track liner 222 radially outward of the fan track liner 222, axially forward toward the forward end 230 of the liner 222, and radially inward back into the gas path 18 near the forward end 230 of the fan track liner 222. No portion of the air recirculation duct 224 extends through the annular case 220.

The injection port 264 may extend through the fan track liner 222 so that the injection port 264 is spaced apart from a front edge 230E of the fan track liner 222 as shown in FIG. 10. In this way, the injection port 264 is spaced axially aft of the hook 248 and does not abut the hook 248. In other embodiments, the injection port 264' is axially aligned with the front edge 230E of the fan track liner 222 as shown in FIG. 10A. In either case, approximately radial holes would need to be made through the fan track liner 222 so that the injection port 264 may extend through the fan track liner 222 at the forward end 230.

If the air recirculation duct 224 is arranged in the channel 236C', the injection port 264 may be circumferentially offset form the extraction port 260. The conduit 262 extends axially and circumferentially between the extraction port 260 and the injection port 264.

Another embodiment of the fan case assembly 310 in accordance with the present disclosure is shown in FIG. 11. The fan case assembly 310 is substantially similar to the fan case assembly 10 shown in FIGS. 1-7 and described herein. Accordingly, similar reference numbers in the 300 series indicate features that are common between the fan case assembly 310 and the fan case assembly 10. The description of the fan case assembly 10 is incorporated by reference to apply to the fan case assembly 310, except in instances when it conflicts with the specific description and the drawings of the fan case assembly 310.

The fan case assembly 310 includes a fan track liner 322 and an air recirculation duct 324 as shown in FIG. 11. The fan track liner 322 defines the gas path 18 of the gas turbine engine 110. The air recirculation duct 324 is configured to direct a portion of gases flowing through the gas path 18 of the gas turbine engine 110 from an aft end of the fan track liner 322 into the gas path 18 axially forward of a forward end of the fan track liner 322.

In the illustrative embodiment, the fan track liner 322 may comprise composite materials. For example, the fan track liner 322 may comprise carbon fiber reinforced polymer materials in some embodiments. The fan track liner 322 may be molded with a channel 336C as shown in FIG. 11.

In the illustrative embodiment, a tool may be used to form the channel 336C in the fan track liner 322 during its formation. The tool would be removed after assembly cure of the fan track liner 322, leaving the molded channel 336C. The air recirculation duct 324 may then be arranged in the channel 336C. In the illustrative embodiment, a bond layer 325 may be used to fix the air recirculation duct 324 in place in the channel 336C as shown in FIG. 11.

In the illustrative embodiment, the air recirculation duct 324 comprises composite materials. The air recirculation duct 324 may be formed separately from the fan track liner 322 and bonded to the fan track liner 322 after the fan track liner 322 has cured. The air recirculation duct 324 forms a part of an outer radial surface 336 of the fan track liner 322.

In the illustrative embodiment, the fan track liner 322 has a continuous outer layer 327 as shown in FIG. 11. The outer layer 327 forms part of the channel 336C. The air recirculation duct 324 is arranged in the channel 336C. The bond layer 325 may be used to fix the air recirculation duct 324 in place in the channel 336C as shown in FIG. 11.

Another embodiment of the fan case assembly 410 in accordance with the present disclosure is shown in FIG. 12. The fan case assembly 410 is substantially similar to the fan case assembly 10 shown in FIGS. 1-7 and described herein. Accordingly, similar reference numbers in the 400 series indicate features that are common between the fan case assembly 410 and the fan case assembly 10. The description of the fan case assembly 10 is incorporated by reference to apply to the fan case assembly 410, except in instances when it conflicts with the specific description and the drawings of the fan case assembly 410.

The fan case assembly 410 includes a fan track liner 422 and an air recirculation duct 424 as shown in FIG. 12. The fan track liner 422 defines the gas path 18 of the gas turbine engine 110. The air recirculation duct 424 is configured to direct a portion of gases flowing through the gas path 18 of the gas turbine engine 110 from an aft end of the fan track liner 422 into the gas path 18 axially forward of a forward end of the fan track liner 422.

In the illustrative embodiment, the fan track liner 422 may comprise composite materials. For example, the fan track liner 422 may comprise carbon fiber reinforced polymer materials in some embodiments. The fan track liner 422 may be molded with a channel 436C as shown in FIG. 12.

In the illustrative embodiment, the air recirculation duct 424 comprises composite materials and is included within the layup of the fan track liner 422 as shown in FIG. 12. The fan track liner 422 may be molded with the channel 436C, but before the fan track liner 422 is assembly cured, the air recirculation duct 424 is arranged in the channel 436C. Then a cover layer 427 is arranged over an outer radial surface 436 of the fan track liner 422 and the air recirculation duct 424. The cover layer 427 then forms an outer radial surface 436S of the fan track liner 422.

Once the cover layer 427 is in place, the assembled components are cured to form a single piece component with encapsulated air recirculation ducts 424. This would result in a smooth outer surface 436S and no potential for water pooling along with greatly reduced de-bonding risk.

Figure 13:
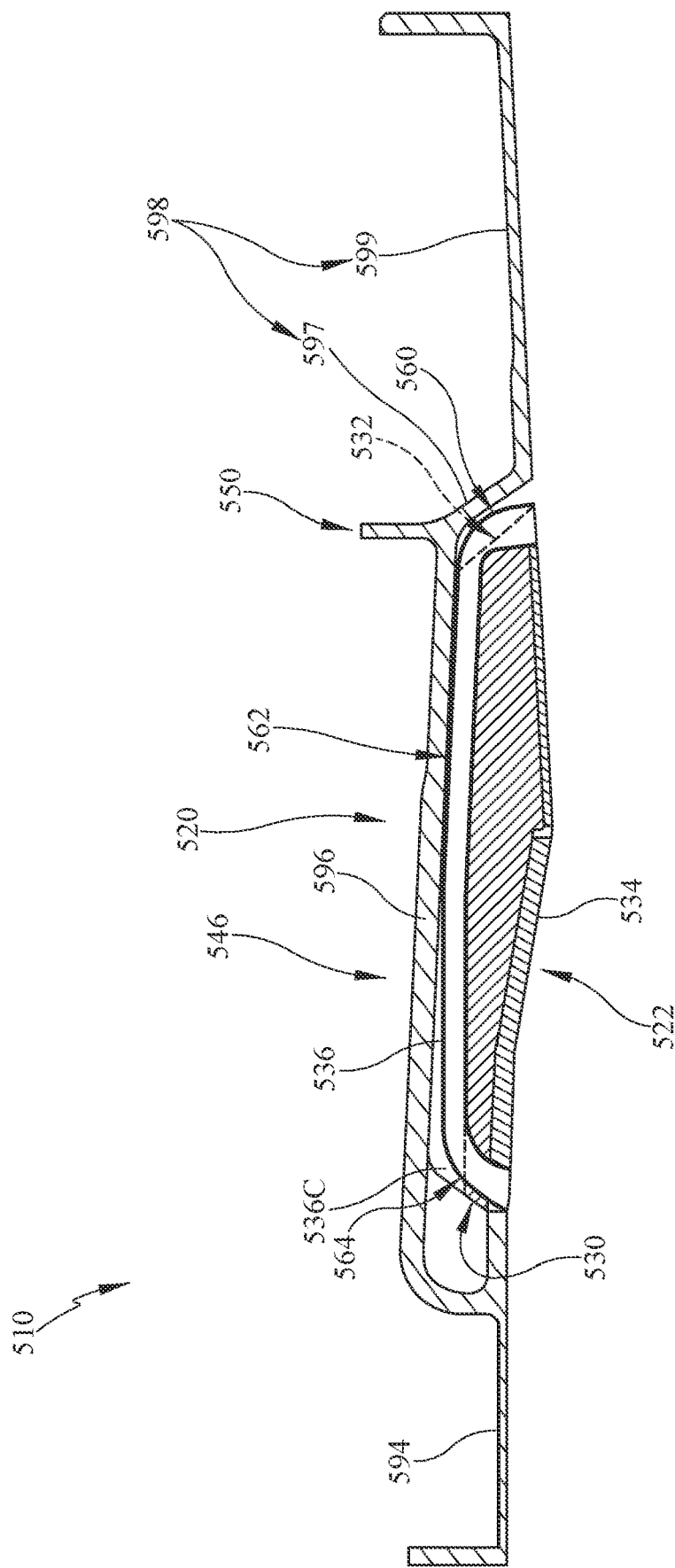
FIG. 13 is another embodiment of a fan case assembly included in the gas turbine engine of FIG. 1 showing the fan case assembly includes an annular carrier, a fan track liner molded with a channel that extends into an outer radial surface of the fan track liner; and an air recirculation duct located in the molded channel of the fan track liner.

Another embodiment of the fan case assembly 510 in accordance with the present disclosure is shown in FIG. 13. The fan case assembly 510 is substantially similar to the fan case assembly 10 shown in FIGS. 1-7 and described herein. Accordingly, similar reference numbers in the 500 series indicate features that are common between the fan case assembly 510 and the fan case assembly 10. The description of the fan case assembly 10 is incorporated by reference to apply to the fan case assembly 510, except in instances when it conflicts with the specific description and the drawings of the fan case assembly 510.

The annular case 520 includes the outer wall 546, a hook 548, and a flange 550 as shown in FIG. 9. The outer wall 546 extends circumferentially around the central axis 11 of the gas turbine engine 110. The hook 548 is configured to support the forward end 530 of the fan track liner 522. The flange 550 extends radially outward from the outer wall 546 axially aft of the hook 548. In the illustrative embodiment, portions of the outer wall 546 define a portion of the gas path 18 of the gas turbine engine 110 as shown in FIG. 9.

The outer wall 546 includes a forward section 594, an intermediate section 596, and an aft section 598 as shown in FIG. 9. The hook 548 is formed between the forward section 594 and the intermediate section 596 of the outer wall 538. The aft section 598 that extends axially aft from the intermediate section 596. The air recirculation conduit 524 extends axially through the flange 550 and through the aft section 598 of the outer wall 546 as shown in FIG. 8.

In the illustrative embodiment, the flange 550 of the case 520 extends from the outer wall 546 at the intersection of the intermediate section 596 and the aft section 598 of the outer wall 546 as shown in FIG. 9. The aft section 598 has a radially-extending portion 597 and an axially-extending portion 599 as shown in FIG. 9. The radially-extending portion 597 extends radially inward from the intermediate section 596 toward the gas path 18 and the axially-extending portion 599 extends axially aft form the radially-extending portion 597. The axially-extending portion 599 forms a portion of the gas path 18.

The fan track liner 522 includes a forward end 530, an aft end 532 spaced apart axially from the forward end 530, and inner and outer radial surfaces 534, 536 as shown in FIG. 13. The inner radial surface 534 defines a portion of the gas path 18 of the gas turbine engine 110. The outer radial surface 536 is spaced radially outward of the inner radial surface 534. In the illustrative embodiment, the fan track liner 522 is bonded to the case 520.

In the illustrative embodiment, the air recirculation duct 524 is located radially inward of the outer radial surface 536 of the fan track liner 522. The outer radial surface 536 is formed to include a channel 536C and the air recirculation duct 524 is located in the channel 536C so that the air recirculation duct 524 is located radially inward of the outer radial surface 536 of the fan track liner 522.

The air recirculation duct 524 includes an extraction port 560, a conduit 562, and an injection port 564 as shown in FIG. 13. Both the extraction port 560 and the injection port 564 are in fluid communication with the gas path 18 of the gas turbine engine 110, while the conduit 562 is in fluid communication with the extraction and injection ports 560, 564. The extraction port 560 extends radially outward from the gas path 18 at a location near the aft end 532 of the fan track liner 522. The conduit 562 extends axially forward from the extraction port 560 toward the forward end 530 of the fan track liner 522 to the injection port 564. The injection port 564 extends radially inward from the conduit 562 toward the gas path 18 at a location near the forward end 530 of the fan track liner 522.

The conduit 562 is located radially inward of the annular case 520 and radially outward of the radially-inwardly facing surface 534 of the fan track liner 522 which defines a portion of the gas path 18 as shown in FIG. 13. The extraction port 560 and the injection port 564 extend radially inward to open into the gas path 18. In this way, a portion of gases flowing through the gas path 18 is directed from the aft end 532 of the fan track liner 522 radially outward of the fan track liner 522, axially forward toward the forward end 530 of the liner 522, and radially inward back into the gas path 18 near the forward end 530 of the fan track liner 522. No portion of the air recirculation duct 524 extends through the annular case 520.

In the illustrative embodiment, the aft end 532 of the fan track liner 522 has a cut-outs such that the extraction port 560 is located axially forward of the aft end 532 of the fan track liner 522 as shown in FIG. 13. The extraction port 560 extends radially inward from the conduit 562 through a portion of the fan track liner 522 and opens in the gas path 18.

Another embodiment of the fan case assembly 610 in accordance with the present disclosure is shown in FIG. 14. The fan case assembly 610 is substantially similar to the fan case assembly 10 shown in FIGS. 1-7 and described herein. Accordingly, similar reference numbers in the 600 series indicate features that are common between the fan case assembly 610 and the fan case assembly 10. The description of the fan case assembly 10 is incorporated by reference to apply to the fan case assembly 610, except in instances when it conflicts with the specific description and the drawings of the fan case assembly 610.

The fan case assembly 610 includes a fan track liner 622 and an air recirculation duct 624 as shown in FIG. 14. The fan track liner 622 extends circumferentially at least partway about the central axis 11 of the gas turbine engine 110 and defines the gas path 18 of the gas turbine engine 110. The air recirculation duct 624 includes extraction ports 660A, 660B, a manifold 662, and injection ports 664A, 664B as shown in FIG. 14.

The extraction ports 660A, 660B and the injection ports 664A, 664B are in fluid communication with the gas path 18 of the gas turbine engine 110, while the manifold 662 is in fluid communication with the extraction and injection ports 660A, 660B, 664A, 664B. The manifold 662 extends between the extraction ports 660A, 660B located near the aft end 632 of the fan track liner 622 and injection ports 664A, 664B located near the forward end 630 of the fan track liner 622 to put them all in fluid communication with each other.

In this way, the portion of gases directed out of the gas path by one of the extraction ports 660A, 660B may flow to either one of the injection ports 664A, 664B.

The air recirculation duct 624 is located a channel so that the air recirculation duct 624 is located radially inward of the outer radial surface 636 of the fan track liner 622. In this way, the air recirculation duct 624 is integrated into the fan track liner 622 and does not need to extend through the annular case.

The second extraction port 660B is spaced apart circumferentially from the first extraction port 660A, and the second injection port 664B is spaced apart circumferentially from the first injection port 664A as shown in FIG. 14. The first extraction port 660A is circumferentially aligned with the first injection port 664A, while the second extraction port 660B is circumferentially aligned with the second injection port 664B as shown in FIG. 14. The manifold extend circumferentially about the axis 11 between the ports 660A, 660B, 664A, 664B.

The manifold 662 includes a first conduit 663, a second conduit 665, and an interconnecting conduit 667 as shown in FIG. 14. The first conduit 663 extends axially forward from the first extraction port 660A toward the forward end of the fan track liner to the first injection port 664A. The second conduit 665 extends axially forward from the second extraction port 660B toward the forward end of the fan track liner to the second injection port 664B. The interconnecting conduit 667 extends circumferentially between the first and second conduits 663, 665.

In the illustrative embodiment, the interconnecting conduit 667 extends at least circumferentially partway about the axis 11 between the first and second conduits 663, 665 so that the gases that enter in the air recirculation duct 624 may flow to either one of the first or second injection ports 664A, 664B. For example, of the gases that flow into the first extraction port 660A, a portion of the gases may flow through the first conduit 663 to the first injection port 664A, while another portion of the gases may flow through the first conduit 663, the interconnecting conduit 667, and the second conduit 665 to the second injection port 664B. Similarly, of the gases that flow into the second extraction port 660B, a portion of the gases may flow through the second conduit 665 to the second injection port 664B, while another portion of the gases may flow through the second conduit 665, the interconnecting conduit 667, and the first conduit 663 to the first injection port 664A.

Another embodiment of the fan case assembly 710 in accordance with the present disclosure is shown in FIG. 15. The fan case assembly 710 is substantially similar to the fan case assembly 10 shown in FIGS. 1-7 and described herein. Accordingly, similar reference numbers in the 700 series indicate features that are common between the fan case assembly 710 and the fan case assembly 10. The description of the fan case assembly 10 is incorporated by reference to apply to the fan case assembly 710, except in instances when it conflicts with the specific description and the drawings of the fan case assembly 710.

The fan case assembly 710 includes a fan track liner 722 and an air recirculation duct 724 as shown in FIG. 15. The fan track liner 722 extends circumferentially at least partway about the central axis 11 of the gas turbine engine 110 and defines the gas path 18 of the gas turbine engine 110. The air recirculation duct 724 includes extraction ports 760A, 760B, a manifold 762, and an injection port 764 as shown in FIG. 12.

The extraction ports 760A, 760B and the injection port 764 are in fluid communication with the gas path 18 of the gas turbine engine 110, while the manifold 762 is in fluid communication with the extraction ports 760A, 760B and the injection port 764. The manifold 762 extends between the extraction ports 760A, 760B located near the aft end 732 of the fan track liner 722 and the injection port 764 located near the forward end 730 of the fan track liner 722 so that the two extraction ports 760A, 760B feed the single injection port 764.

The air recirculation duct 724 is located a channel so that the air recirculation duct 724 is located radially inward of the outer radial surface 736 of the fan track liner 722. In this way, the air recirculation duct 724 is integrated into the fan track liner 722 and does not need to extend through the annular case.

In the illustrative embodiment, the air recirculation duct 724 includes two extraction ports 760A, 760B that feed the one injection port 764 as shown in FIG. 15. The second extraction port 760B is spaced apart circumferentially from the first extraction port 760B. In other embodiments, the air recirculation duct 724 may have more than two extraction ports 760A, 760B that feed the one injection port 764.

In the illustrative embodiment, the air recirculation duct 724 includes two extraction ports 760A, 760B that feed the one injection port 764 as shown in FIG. 15. The second extraction port 760B is spaced apart circumferentially from the first extraction port 760B. In other embodiments, the air recirculation duct 724 may have more than two extraction ports 760A, 760B that feed the one injection port 764.

In the illustrative embodiment, the injection port 764 is circumferentially between the first extraction port 760A and the second extraction port 760B as shown in FIG. 15. The manifold 762 extends between the injection port 764 and the first and second extraction ports 760A, 760B.

The manifold 762 includes a central duct 763 and a plurality of conduits 765, 767, 769 that extend from the central duct 763 to one of the ports 760A, 760B, 764 as shown in FIG. 15. The central duct 763 is arranged axially between the extraction ports 760A, 760B and the injection port 764. The first conduit 765 extends axially forward from the first extraction port 760A to the central duct 763. The second conduit 767 extends axially forward from the second extraction port 760B to the central duct 763. The third conduit 769 extends axially aft from the injection port 764 to the central duct 763.

A portion of the gases from the gas path 18 flows into the extraction ports 760A, 760B and the corresponding conduits 765, 767 direct the portion of gases to the central duct 763. Then the combined flows are flow through the third conduit 769 to the injection port 764. The combined flow is then injected back into the gas path 18 axially forward of the forward end of the fan track liner.

Tip Injection may be a powerful tool to increase stall margin of a compressor or a fan. However, integrating such a system into a fan case can be difficult. The fan has complex systems for fan blade out containment that are problematic to work around such that the structural integrity of the fan case is not significantly affected.

The present disclosure relates to integrating tip injection in the fan 112 of the gas turbine engine 110 without affecting the structural integrity of the annular case 20. An air recirculation duct 24 is integrated radially outboard the fan track liners 22. In the illustrative embodiment, the air recirculation duct 24 is located circumferentially between adjacent liner segments 22A, 22B. Alternatively, the air recirculation duct 224, 324, 424, 524 is integrated into the fan track liner 222, 322, 422 (on top of them or as part of the liner). This would extract flow from the aft end of the fan track liners 22, 222, 322, 422, 522 and then inject ahead of the rotor, just aft of the containment hook 40, 240, 540.

This allows the system to be within the annular case 20, 220, 520 removing the hurdle of large holes in the main impact region of the annular case 20, 220, 520. Composites enable molded components that may be well suited to definition of such an arrangement. When it comes to tip injection technology, there is great difficulty often in getting it to fit within the design spaces. Including pipes or ducts around the flowpath 18 while not interfering with the function of the containment case 20, 220, 520 may be difficult. The air recirculation duct 24, 224, 324, 424 524 would allow for it to be done in a relatively weight efficient and cost effective manner. It would bring with it increased stall margin, which would allow operation in more challenging environments, i.e. embedded or boundary layer injection applications.

To make integrating tip injection in the fan feasible, the present disclosure considers how to provide sufficient recirculation flow without disrupting the crucial aspects of the containment system functionality. Off-takes behind the fan track liner 22, 222, 322, 422, 522 may connect via molded channels to the front of the liner 22, 222, 322, 422, 522 and then inject the flow just ahead of the rotor leading edge.

In the illustrative embodiment, the fan track liner 22 continues aft to accommodate the extent of high energy ice shedding. The fan track liner 22 includes a margin before the rear acoustic panel 28 begins. This usually includes a gap that is filled with sealant; however, it could be feasible to cut the aft end of the fan track liner panel with castellated regions to allow for the extraction port 60 to be included between it and the RAP. This could then direct the flow forward and over the top of the fan track liner or between the array of fan track liners.

The particular size and count of the air recirculation ducts 24 may be tailored to a specific fan size and stall margin improvement for the gas turbine engine 110. This is due to the fact that changes in recirculation flow can modify the stall improvement and this is correlated with the flow of the fan overall. Therefore, larger ports or a higher count may be used for different sized fans.

For example, in some embodiments, the radial height below the tray outer surface may be 8 mm, while the space between liners 22A, 22B provides a similar cross-section area as one duct 24 over the liner.

For a medium-sized fan system, there may be one air recirculation duct 24 per each of the liner gaps between the fan track liner segments 22A, 22B. In other embodiments, the assembly may have one, two, three, or four air recirculation ducts 24 per liner segment.

The count of segments 22A, 22B could be 7-off or 9-off for instance, depending on the engine size and other factors. This may result in the number of air recirculation ducts 24 being 7, 9, 14, 18, 21, 27, 28, or 36 as potential considerations. For packaging with radially short ducts 24, more may be included with a large stall margin increase being obtained. On the other hand, fewer larger ducts 24 may be utilized between fan track liners for a modest increase in stall margin. An optimal trade between stall margin needed and weight/complexity of the system can therefore be found.

The extraction port 60 may be flush to flowpath 18. It might also be larger, and could include a small scoop 76 or other means to increase flow into it (potentially deployable/storable to minimize disruption when the system is not in use). There may also be a flap or throttle valve across the opening that blocks flow when additional stall is not required and efficiency debit is to be minimized. The flap could pivot from being a blocking door to a scoop to help recover more flow/pressure into the channel-way. Another option would be a butterfly valve 74 or similar to block flow into the extraction port when system is not on.

For the first incorporation, fan track liners are removed radially. Given the width of the panels and their count, their edges are cut so they may be moved vertically with it. The edges therefore have a wedge-shaped cut as shown in FIGS. 6 and 7 to allow for free rotation and removal. In this space, there is typically a seal strip that is bonded to the side of one of the liners and then filler between the panels is applied. This provides adequate space for air recirculation duct installation.

The air recirculation duct 24 is located in the space between the liners 22A, 22B to recirculate air flow from aft to front of the fan track liners 22A, 22B. This system may be installed before the liners 22A, 22B and then the air recirculation ducts 24 themselves used to help support filler application. Since the liner edges are more parallel to the installation direction, they will simply slide past the air recirculation ducts 24.

It may be important to ensure that the air recirculation ducts 24 are frangible as not to impede the travel of a released fan blade/blisk airfoil into the containment hook. For example, it may be thin glass-reinforced plastic instead of steel or the like. Having the injection port open radially inward ahead of the containment hook 40 would help to reduce risk of forward debris. To design this as a proper system, the space for the tip injection turn-down must be permitted with sufficient space to the hook cavity and then also sufficient space to the rotor leading edge. The position of the hook for example may be a percentage of the blade axial chord while the tip injection may be less than that percentage of the blade axial chord ahead of the rotor.

With the air recirculation duct 24, larger diameter would help reduce pressure losses. However, practical limitations are considered due to increased size of the space between liners 22A, 22B leading to increased weight (if containment case is more outward and the liners are deeper than typical). If losses would need to be reduced to increase stall margin system effectiveness, the size or count of the air recirculation duct 24 could be increased at sacrifice of weight.

In some embodiments, the duct 24 has a circular cross-section that fills the gap between liners as shown in FIG. 6. The duct 24 may have supports 71 attached to the duct 24 to secure the duct 24 in place relative to the liner 22. The supports 71 may engage the annular case 20. In some embodiments, the supports 71' attached to the duct 24 may engaged with one of the liners 22A, 22B. In this way, the supports 71' may give a way to bond the duct 24 to one side 42, 44 of the adjacent fan track liner segment 22A, 22B.

Another alternative would be to design and mold a shape to fit the space between the liners 22A, 22B as shown in FIG. 7. This could be feasible with over-braiding a form in the space of the channel as it runs axially for cost effective production. This would increase the cross-sectional area by about 50-60% relative to a circular cross-section. In the illustrative embodiment, the cross-section has a trapezoidal shape as shown in FIG. 7.

The duct 24 may be joined to one of the liner segments 22A, 22B or formed integrally therewith. In other embodiments, the duct 24 may be pre-bonded to the case 20 and the liner segments 22A, 22B installed over the duct 24. For instance, the supports 71 may be pre-bonded to the case 20 or one side of the duct 24 with the different shape may be pre-bonded to the case 20. In both cases, the assembly include tolerances to assembly the components.

As explained above, the tip injection would be placed between the rotor leading edge 30 and the containment hook 40. The air recirculation duct 24 would support filler between the liner segments 22A, 22B. The injection port 64 extends through the liner 22 at the forward end 30 of the liner 22. The injection port 64 is then carefully filled around with abradable material. The liner segments 22A, 22B may need to have large enough holes to go around the injection port 64, while still maintaining enough integrity by the forward fasteners so that the flanges would not be broken during installation or in-flight impacts such as bird strike or ice shed. However, the air recirculation ducts 24 may help provide support as well. A radial cut in the liner 22 is likely the most feasible means of slipping it past the down-turn for injection, with a chamfer to clear the radius of the down-turn of the duct 24.

The other incorporation would be to mold the outer radial surface 236, 336, 436 with axial channels 236C, 336C, 436C to permit the air recirculation ducts 224, 324, 424 to be over the liner 222, 322, 422. This is feasible with composites, such as by putting bosses the size of the channels 236C, 336C, 436C into the mold tooling and then laying up the component on the tool with care to ensure it drapes nicely over the bosses without kinks or other issues. This practice is well known to those familiar in the art.

This would make possible to have a series of valleys or channels 236C, 336C, 436C in the liner 222, 322, 422. The honeycomb would have to be milled to suit this offset, as well as additional film adhesive or expanding foam used for integrity against acoustic fatigue. This option might be higher cost and weight, but would allow for higher volumetric flow. The need for such would be determined by the fan's flow at the condition of interest as well as how much stall margin was required—depending on rotor design and installation. With this method, perhaps 1-2% of flow may be recirculated on small or medium engines depending on the condition of interest and other factors, such as port size.

There are three options for incorporating the channels 336C, 436C in the composite fan track liner 322, 422. The first being molding the tray of the fan track liner 322 with bosses on the tool and then cold bonding a separately molded air recirculation duct 324 in the channel 336C.

Another approach would be to mold the air recirculation duct 424 from composite material and include it within the layup of the fan track liner 422. The first ply of the liner or a cover ply may be put down on a smooth tool, placing the air recirculation ducts 424 down into their location, and then laying up the rest of the tray to encapsulate them. This would result in a smooth outer surface 436S and no potential for water pooling.

The final option would be to mold a flat liner 22, but cut out a channel in the honeycomb and embed the air recirculation duct 24 within the fan track liner 22 during its curing, such that foaming film adhesive or similar supports the air recirculation duct 24 and honeycomb and the down-turn and injector fits with the abradable pieces. This would be truly an integral design.

With sufficient radial space for the air recirculation duct 224, flow can be extracted radially at the aft end 232 of the liner 222 then ported to the forward end 230 and then finally injected after a radial down-turn. The exact axial location may be modified based on how the rotor best responds as well as the rotor's location relative to the containment hook 240. At the most-forward position, the injector 264' could touch the containment hook 240 (as long as it is fragile enough to be broken through during FBO). While the overall injector body may be ½' in axial length, it is likely that the actual flow orifice may be tighter (such as ¼"). The intent may be to suit a nozzle-like device to lay the flow down, aimed axially aft and increase velocity at its exit.

The actual axial length of the injector opening, its trajectory, and its width may be modified to suit a particular tip injection system design, but the focus here is the design space and potential integration being described. As needed, the injector 64 could be narrower axially and the width 64W suited to deliver the desired velocity and volumetric flow. Incorporation of a venturi or similar device may aid in maximizing flow out of the injector, such as with a Coanda type injector, which brings the flow to a narrow throat just before entering the flowpath to lay down a high velocity steam.

For an example configuration, there may be 5-off fasteners forward and aft on the fan track liner 222. Between each pair of fasteners, a channel 236C, 236C' may be molded into the liner 222 to permit the air recirculation duct 224 to be installed. It is also possible that only two air recirculation ducts 224 are included, or only one, or there could be three.

In some embodiment, the liner 222 may have channels 236C at 4-off circumferential locations with air recirculation ducts 224 arranged therein. This permits the fan rotor to be surrounded by a smooth abradable surface with the recirculation also being within the containment case wall. The air recirculation ducts 224 may be bonded to the liners 222 and the assembly installed as a unit into the case 220, which may be more attractive than having them separate between the liners. This may take some work to install and add filler between the liners.

An individual air recirculation duct 224 imbedded in the liner 222 could be just under the size of a passage between two liners. Meaning, with 4-off channels per liner, the system may yield a quadrupling in total flow area for recirculation. Again, the decision between area and count is to be tailored to a particular fan's needs, but this serves as an example of what could be done in response to a requirement.

The injection port 264' may be at the front of the abradable section (butting up against the case) as shown in FIG. 10A. Alternatively, the injection port 264 may be offset slightly to be fully within the abradable section). Either one would need radial cuts through the liner to accommodate. If casing hooks were utilized, then the tray could be uniform (no recesses) with the recirculation just occurring between hooks.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan case assembly adapted for use with a gas turbine engine, the fan case assembly comprising
    a fan track liner that extends circumferentially at least partway about a central axis, the fan track liner including a forward end, an aft end spaced apart axially from the forward end, and an inner radial surface that extends between the forward end and the aft end to define a gas path of the fan case assembly,
    an annular case configured to support the fan track liner at a radial position relative to the central axis, the annular case including an outer wall that extends circumferentially around the central axis and a hook that extends radially inward from the outer wall and engages the forward end of the fan track liner to support the forward end of the fan track liner, and
    a plurality of discrete air recirculation ducts which are not in direct fluid communication with each other and each configured to direct a portion of gases flowing through the gas path of the fan case assembly near the aft end of the fan track liner into the gas path near the forward end of the fan track liner, each air recirculation duct including
        an extraction port in fluid communication with the gas path of the fan case assembly that extends radially outward from the gas path at the aft end of the fan track liner,
        a conduit in fluid communication with the extraction port, the conduit extends axially forward from the extraction port toward the forward end of the fan track liner, the conduit located radially inward of the outer wall, and
        an injection port in fluid communication with the gas path of the fan case assembly and the conduit, the injection port extends radially inward from the conduit toward the gas path at the forward end of the fan track liner and the hook of the annular case,
    wherein the fan track liner includes a plurality of fan track liner segments arranged in circumferentially confronting relation to each other about the central axis, each air recirculation duct of the plurality of discrete air recirculation ducts is located in a gap formed circumferentially between a first fan track liner segment and a second fan track liner segment included in the plurality of fan track liner segments, and the second fan track liner segment arranged in circumferentially confronting relation to the first fan track liner segment to define the gap therebetween.

2. The fan case assembly of claim 1, wherein the injection port opens into the gas path axially aft of the hook.

3. The fan case assembly of claim 2, wherein the injection port opens into the gas path circumferentially between the first fan track liner segment and the second fan track liner segment and the injection port opens into the gas path axially aft of the forward end of the first and second fan track liner segments.

4. The fan case assembly of claim 3, wherein the extraction port opens into the gas path axially aft of the aft end of the first and second fan track liner segments.

5. The fan case assembly of claim 1, wherein each air recirculation duct has one of a circular cross-section, an oblong cross-section, a rectangular cross-section, and a trapezoidal cross-section when viewed in an axial direction.

6. The fan case assembly of claim 1, wherein the fan track liner further includes an outer radial surface spaced radially outward of the inner radial surface that extends between the forward end and the aft end of the fan track liner, and wherein the conduit of the air recirculation duct is located radially inward of the outer radial surface of the fan track liner.

7. A fan case assembly adapted for use with a gas turbine engine, the fan case assembly comprising
    a fan track liner that extends circumferentially at least partway about a central axis, the fan track liner including a forward end, an aft end spaced apart axially from the forward end, and an inner radial surface that extends between the forward end and the aft end to define a gas path of the fan case assembly,
    an annular case coupled with the fan track liner to support the fan track liner radially in the gas turbine engine, the annular case including an outer wall that extends circumferentially at least partway around the central axis and a hook that extends radially inward from the outer wall and radially inward of the forward end of the fan track liner to support the forward end of the fan track liner, and an air recirculation duct including an extraction port in fluid communication with the gas path of the fan case assembly that extends radially from the gas path at a location near the aft end of the fan track liner, a conduit that extends axially from the extraction port radially inward of the annular case, and an injection port in fluid communication with the gas path of the fan case assembly that extends radially from the conduit at a location near the forward end of the fan track liner, wherein the injection port opens into the gas path axially aft of the hook and the extraction port opens into the gas path axially aft of the fan track liner.

8. The fan case assembly of claim 7, wherein the fan track liner includes a first fan track liner segment and a second fan track liner segment arranged in circumferentially confronting relation to the first fan track liner segment, and the air recirculation duct is located circumferentially between the first and second fan track liner segments.

9. The fan case assembly of claim 8, wherein the injection port opens into the gas path circumferentially between the first fan track liner segment and the second fan track liner segment and the injection port opens into the gas path axially aft of the forward end of the first and second fan track liner segments.

10. The fan case assembly of claim 8, wherein the extraction port opens into the gas path axially aft of the aft end of the first and second fan track liner segments.

11. The fan case assembly of claim 7, wherein the air recirculation duct has one of a circular cross-section, an oblong cross-section, a rectangular cross-section, and a trapezoidal cross-section when viewed in an axial direction.

12. The fan case assembly of claim 7, wherein the fan track liner further includes an outer radial surface spaced radially outward of the inner radial surface that extends between the forward end and the aft end of the fan track liner, and wherein the conduit of the air recirculation duct is located radially inward of the outer radial surface of the fan track liner.

13. The fan case assembly of claim 7, wherein the conduit of the air recirculation duct extends axially and circumferentially between the extraction port and the injection port relative to the central axis.

14. A method comprising
providing a fan track liner that extends circumferentially at least partway about a central axis, an annular case that extends around the central axis, and an air recirculation duct, the fan track liner including a forward end, an aft end spaced apart axially from the forward end, and inner and outer radial surfaces that extend between the forward end of the fan track liner and the aft end of the fan track liner, and the air recirculation duct including an extraction port, an injection port, and a conduit that extends between and interconnects the extraction port and the injection port, arranging the air recirculation duct adjacent the fan track liner so that the injection port is located near the forward end of the fan track liner and the extraction port is located near to the aft end of the fan track liner, and coupling the fan track liner to the annular case so that the air recirculation duct is located radially inward of the annular case, wherein the fan track liner includes a first fan track liner segment and a second fan track liner segment, and the method further comprises arranging second fan track liner segment in circumferentially confronting relation to the first fan track liner segment to locate the air recirculation duct circumferentially therebetween.

15. The fan case assembly of claim 1, further comprising supports coupled to each air recirculation duct included in the plurality of discrete air recirculation ducts and arranged to extend between each air recirculation duct and one of the fan track liner and the annular case to secure each air recirculation duct in place relative to the fan track liner.

16. The fan case assembly of claim 1, wherein the injection port opens into the gas path circumferentially between the first fan track liner segment and the second fan track liner segment and abradable material is arranged to fill in space around the injection port.

17. The fan case assembly of claim 16, wherein the injection port has a rectangular cross-section when viewed in an axial direction and the extraction port and the conduit have a circular cross-section when viewed in the axial direction.

18. The fan case assembly of claim 1, wherein a cross-sectional area of the injection port is less than a cross-sectional area of the conduit.

19. The fan case assembly of claim 7, wherein the injection port has a different cross-section shape compared to the extraction port and the conduit.

20. The fan case assembly of claim 8, wherein the first fan track liner segment includes a first circumferential end that extends axially between the forward end and the aft end of the fan track liner and the second fan track liner segment includes a second circumferential end that extends axially between the forward end and the aft end of the fan track liner, and wherein the first and second circumferential ends define chamfer surfaces, the first circumferential end of the first fan track liner segment is arranged in circumferential confronting relation to the second circumferential end of the second fan track liner segment so that the first and second chamfer surfaces face each other, and the conduit of the air recirculation duct is arranged between the first and second chamfer surfaces.

* * * * *